United States Patent
Agrawal et al.

(10) Patent No.: US 11,646,693 B2
(45) Date of Patent: May 9, 2023

(54) ORIENTATION OF PHOTOVOLTAIC MODULES TO MINIMIZE INTERCEPTED RADIATION IN PHOTOVOLTAIC AGLECTRIC SYSTEMS

(71) Applicants: Rakesh Agrawal, West Lafayette, IN (US); Peter Andrew Bermel, West Lafayette, IN (US); Allison Perna, Berthoud, CO (US)

(72) Inventors: Rakesh Agrawal, West Lafayette, IN (US); Peter Andrew Bermel, West Lafayette, IN (US); Allison Perna, Berthoud, CO (US)

(73) Assignee: NATIONAL SCIENCE FOUNDATION, Alexandria, VA (US)

( * ) Notice: Subject to any disclaimer, the term of this patent is extended or adjusted under 35 U.S.C. 154(b) by 0 days.

(21) Appl. No.: 16/997,386

(22) Filed: Aug. 19, 2020

(65) Prior Publication Data

US 2021/0067087 A1    Mar. 4, 2021

Related U.S. Application Data

(60) Provisional application No. 62/889,756, filed on Aug. 21, 2019.

(51) Int. Cl.
*H02S 20/32*       (2014.01)

(52) U.S. Cl.
CPC .................. *H02S 20/32* (2014.12)

(58) Field of Classification Search
CPC ...... H02S 20/32; H02S 20/30; F24S 2020/16; F24S 2020/186; F24S 2020/23
See application file for complete search history.

(56) References Cited

U.S. PATENT DOCUMENTS

| | | | |
|---|---|---|---|
| 2012/0048340 A1* | 3/2012 | Qadir | H02S 20/10 136/246 |
| 2014/0261630 A1* | 9/2014 | Morgan | H02S 20/32 136/246 |
| 2015/0316639 A1* | 11/2015 | Russ | H02S 20/32 250/203.4 |
| 2020/0059193 A1* | 2/2020 | Sgarrella | H02S 20/32 |
| 2020/0127597 A1* | 4/2020 | Reboldi | H02S 20/10 |

* cited by examiner

*Primary Examiner* — Bethany L Martin
(74) *Attorney, Agent, or Firm* — C. John Brannon; Brannon Sowers & Cracraft PC

(57) ABSTRACT

A photovoltaic system for generating electrical power on farmland while minimizing reduction of solar radiation incident on ground due to shadowing, including a photovoltaic module having a first photovoltaic face defining a first plane, a normal axis extending from the first plane, a first pivot axis extending through the photovoltaic module, a second pivot axis extending through the photovoltaic module, at least one motor operationally connected to pivot the photovoltaic module about at least one pivot axis, and an electronic controller operationally connected to at least one motor. An incident solar ray strikes the photovoltaic module at an angle of incidence defined as an intersection of the incident solar ray and the normal axis. The electronic controller sends signals to the at least one motor to maintain the angle of incidence as close as possible to ninety degrees.

8 Claims, 17 Drawing Sheets

ORIENTATION OF PHOTOVOLTAIC MODULES TO MINIMIZE INTERCEPTED RADIATION IN PHOTOVOLTAIC AGLECTRIC SYSTEMS

CROSS-REFERENCE TO RELATED APPLICATIONS

This patent application claims priority to co-pending U.S. provisional patent application Ser. No. 62/889,756 filed on Aug. 21, 2019.

STATEMENT REGARDING GOVERNMENT FUNDING

This invention was made with government support under Contract No. 1735282 awarded by National Science Foundation. The government has certain rights in the invention.

TECHNICAL FIELD

The present disclosure relates to the off-axis orientation of vertical photovoltaic modules on farmland to minimize the reduction in radiation on the ground due to shadowing. The goal is to minimize and preferably eliminate any negative impact due to the shadow on plant growth and crop yield. This invention enables cogeneration of food and energy from a farmland.

BACKGROUND

This section introduces aspects that may help facilitate a better understanding of the disclosure. Accordingly, these statements are to be read in this light and are not to be understood as admissions about what is or is not prior art.

Within the next two to three generations, our world is expected to grow from seven to more than ten billion people for a 'full earth'. This increase in population, coupled with rising per capita income and consumption habits, will create unprecedented stress on food, energy, and water (FEW) demand and supply. A daunting question before us is: how can humans sustainably meet their current as well as full earth FEW needs with renewable resources?

Solar radiation is the only energy resource that is both locally available and sustainable, and it is the only resource with potential to meet the entire FEW needs for the full earth at any time in the future. However, even to meet current demand levels in most population centers around the globe, the nature of solar radiation leads to critical competition for land between food and energy.

To address this competition, systems achieving co-production of energy and food generation on the same land have been proposed. These so-called agrivoltaic or photovoltaic (PV) aglectric systems combine agricultural production and solar energy production on the same land area. Most current practices devote a subsection of land area to agricultural production and another subsection to fuel production, which includes systems proposing inter-layering of fuel systems and agriculture. The theoretical advantage of PV aglectric systems is the vertical development of land, which improves overall land productivity.

To quantitatively describe this increase in land productivity, the metrics "Land Use Efficiency" and "Land Equivalent Ratio" (LER) have been recently adopted. Land Equivalent Ratio is used to assess the productivity of mixed systems, such as intercropping, compared to single crop systems, and is defined for the PV aglectric system as:

$$LER = \frac{Y_{crop,aglectric}}{Y_{crop,ag}} + \frac{Y_{electricity,aglectric}}{Y_{electricity,PV}}$$

where:
$Y_{crop,\ aglectric}$=Crop yield in PV aglectric system
$Y_{crop,\ Ag}$=Crop yield in agriculture only system
$Y_{electricity,\ aglectric}$=Electricity yield in PV aglectric system
$Y_{electricity,\ PV}$=Electricity yield in photovoltaic only system In the past decade, some previously theorized PV aglectric systems have been implemented in Europe using the LER metric to determine success. In France, a south-facing PV aglectric system with full (1.6 m row width) and half density (3.2 m row width) panels (0.8 m wide) was developed, which caused spatially varying transmitted radiation on the crops. This system was later paired with tracking PV aglectric systems, one of which used a simple anti-solar-tracking (dubbed "controlled tracking") algorithm to minimize midday radiation loss; these systems caused a homogenous spatial distribution of transmitted radiation on crops. The loss in radiation caused a statistically significant biomass loss of lettuce in spring and summer months, suggesting that care must be taken in tracking systems to minimize intercepted radiation in a way that does not impede crop growth. In Germany, it was demonstrated that an 18-19% loss in wheat, potato, and celeriac yield was due to radiation loss using a fixed-tilt south-facing PV aglectric system with an LER of 160%. It was also demonstrated that shading provided by PV panels during hot months could increase crop yield for potatoes, giving their system an overall LER of 186%. This suggests that controlled shading using tracking algorithms and optimized PV orientation angles such as those suggested hereinbelow are necessary for optimizing crop yield.

However, LER does not capture the full picture. In countries, states, and regions that are land-constrained in their ability to self-sufficiently produce electricity and food for their populace using primarily land-intensive renewable electricity generation strategies such as solar, wind, or biomass, the LER metric is misleading. LER assumes that the additional land for PV installation can be converted for agriculture production. Then it calculates a composite food production from the existing agricultural land with added PV and with this additional land producing food. However, generally such additional land is either unavailable for PV installation or the additional land is unsuitable for food production. For the UK and other densely populated regions, it is found that this is the case. Thus, the only parameter of interest is to reduce any negative impact on crop yield due to the use of PV panels on the agricultural land. Regions that are land-constrained must implement co-production strategies to support a sustainable food and energy *nexus*.

Major agricultural crops in the U.S. undergo one of two major photosynthesis types: C3 or C4. As distinct metabolic pathways, they experience different utilization of resources such as water, $CO_2$, and photosynthetically active radiation (PAR). In the case of C3 plants, the photosynthetic rate generally saturates at lower levels of irradiance than for C4 crops, and this level is often below the midday irradiance for many agricultural regions. This trait suggests that redirecting the irradiance of crops for electricity production may not affect crop yield for C3 plants.

However, there are multiple other requirements for maintaining crop yield besides net radiation incident on the farmland. For field crops, homogeneity of irradiance reductions is crucial for most farming practices. Additionally, the duration of direct shadows during periods of low irradiance (near sunrise and sunset) may push plants into low photosynthetic rate regimes, or possibly into respiratory regimes, which can negatively impact plants. Therefore, PV aglectric systems that manipulate PV orientation in ways that allow a range of shadowing scenarios may increase overall crop yield.

For all food and electricity co-production systems, agriculture can only use transmitted radiation not first absorbed by the panels. This creates an inherent trade-off. One consideration to designing PV aglectric systems, therefore, is to manipulate and maximize the solar irradiance incident on the ground for a given solar electricity output.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. Further, in this disclosure, the figures shown for illustrative purposes are not to scale and those skilled in the art can readily recognize the relative dimensions of the different segments of the figures depending on how the principles of the disclosure are used in practical applications.

DETAILED DESCRIPTION

For the purposes of promoting an understanding of the principles of the disclosure, reference will now be made to the embodiments illustrated in the figures and specific language will be used to describe the same. It will nevertheless be understood that no limitation of the scope of the disclosure is thereby intended, such alterations and further modifications in the principles of the disclosure, and such further applications of the principles of the disclosure as illustrated therein being contemplated as would normally occur to one skilled in the art to which the disclosure relates.

As illustrated in FIGS. 1-10, the present disclosure relates to the off-axis orientation of vertical photovoltaic modules on farmland to minimize the reduction in radiation on the ground due to shadowing. The goal is to minimize and preferably eliminate any negative impact due to the shadow on plant growth and crop yield. This invention enables cogeneration of food and energy from a farmland.

Bifacial panels provide a method of mitigating this tradeoff, by collecting radiation that is specifically unused by crops and reflected by the field. Notably, this includes reflections from 500-565 nm (green) and 750-2500 nm (near-infrared).

Figure 8:
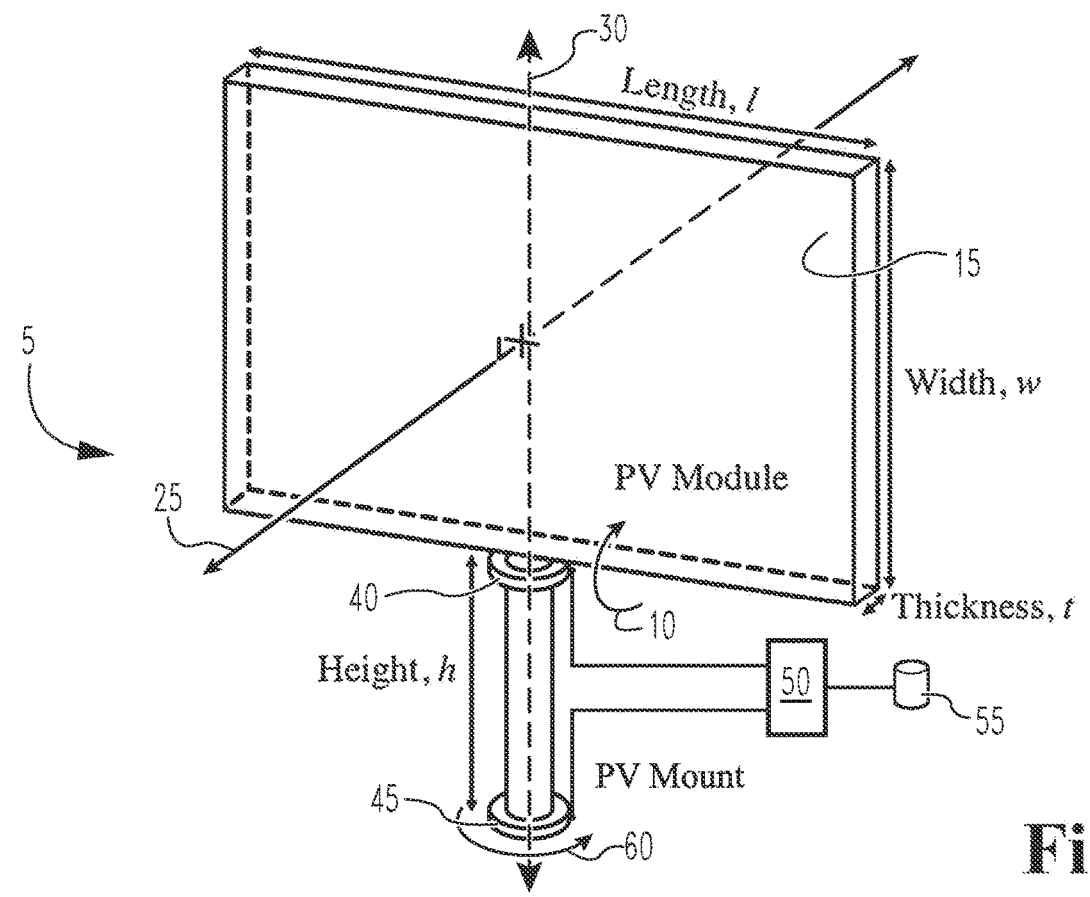
FIG. 8 shows schematic representation of photovoltaic module dimensions and rotation axes.
Figure 9:
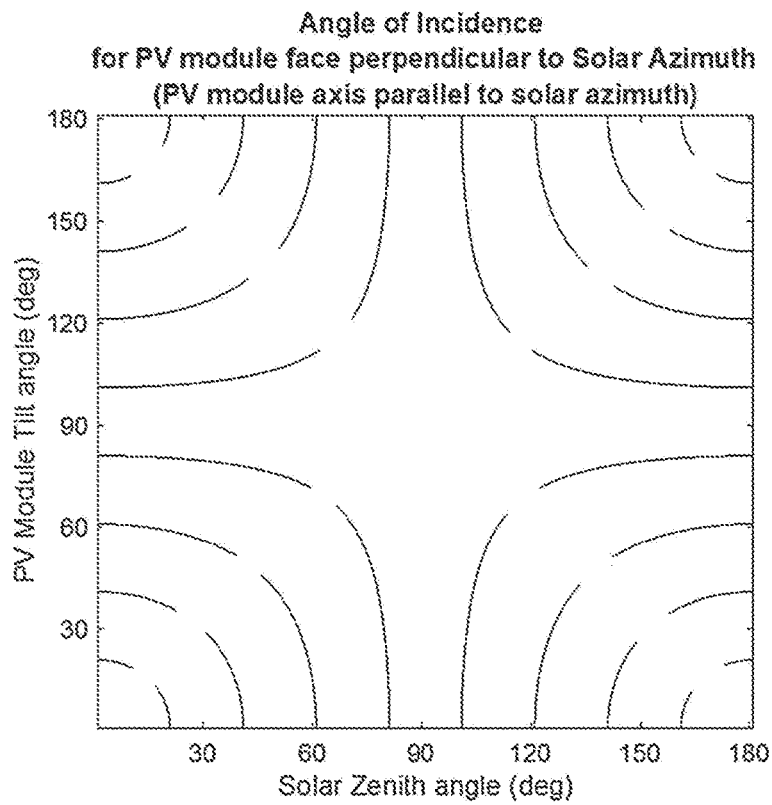
FIG. 9 shows angle of incidence based on Eqn. 1 for all solar zenith and module tilt angles for PV module active face normal azimuth continuously perpendicular to the solar azimuth angle ($Az_s-Az_m=90°$). Since AOI of 90° is available for all solar zenith angles, this orientation is an option during the growing season.
Figure 10:
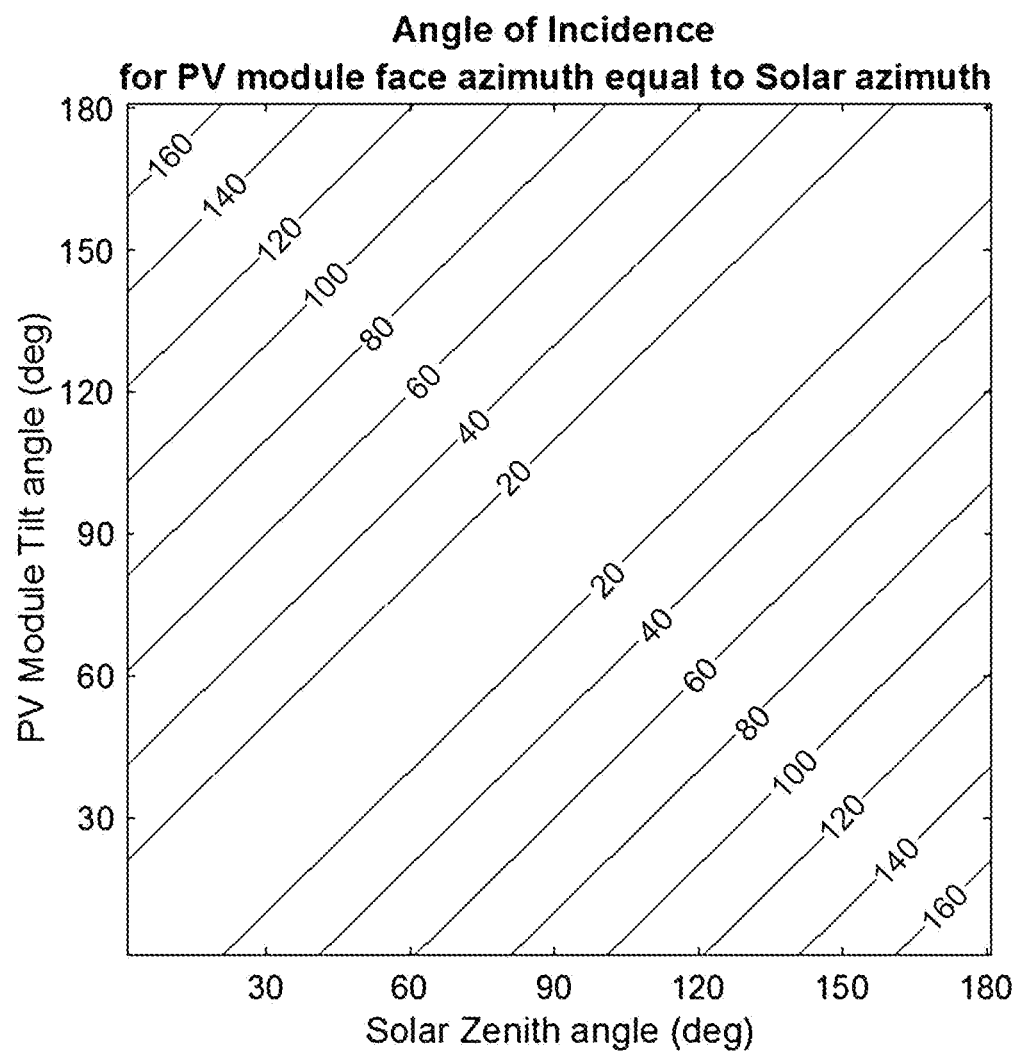
FIG. 10 shows angle of incidence based on Eqn. 1 for all solar zenith and module tilt angles for PV module active face normal azimuth continuously parallel to the solar azimuth angle ($Az_s=Az_m$). Since AOI of 0° and AOI of 90° is available for all solar zenith angles, this orientation is an option during the off-growing season and during the growing season.

Maximizing the angle of incidence, AOI, up to 90°, between the solar ray and the photovoltaic, PV, module active face normal at a given time minimizes direct shadow area on the field created by an elevated PV module and minimizes intercepted radiation. The active face is the width by length face (both sides in a bifacial PV module, one side in a monofacial PV module, which is primarily responsible for generating the majority if not all of the electricity), and the inactive faces are the width by thickness and the length by thickness faces (FIG. 8). Maximizing this angle of incidence minimizes the direct radiation loss on the field due to PV module radiation interception. Diffuse light is maximal around the solar disc, decreasing with distance away from the solar disc in the celestial sphere. This means that maximization of the AOI of direct solar rays on the PV module active face to minimize shadow area will also minimize diffuse radiation loss on the field due to PV module radiation interception. We take the angle of incidence to be (FIG. 1):

$$AOI = \cos^{-1}[\cos(T_m)\cos(Z_s) + \sin(T_m)\sin(Z_s)\cos(AZ_s - AZ_m)] \quad (1)$$

where:
AOI=Solar angle of incidence on PV module (deg)
$T_m$=Tilt angle of module (deg, 0° is horizontal)
$Z_s$=Solar zenith angle (deg)
$AZ_s$=Solar azimuth angle (deg, North=0°, East=90°)
$AZ_m$=PV face azimuth angle (deg, North=0°, East=90°)

Figure 1:
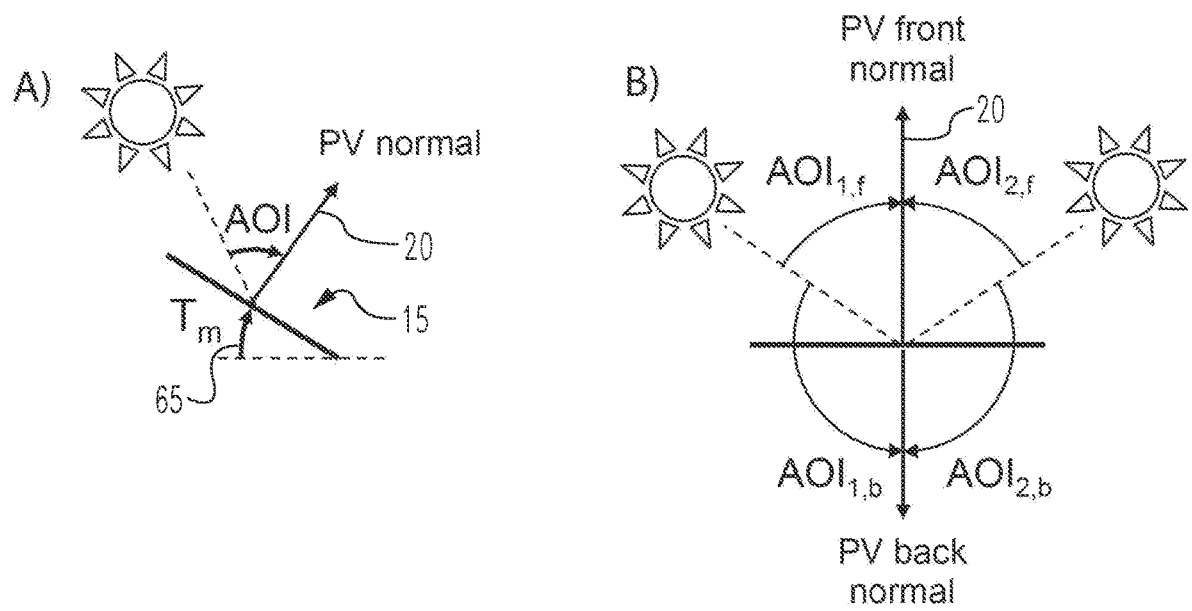
FIG. 1 shows the angle of incidence (AOI). AOI is the angle between the directly incident solar rays and the PV face normal. A) Schematic of 2D view of AOI with PV module tilt. B) Schematic of 2D view of AOI for front and back PV module faces where $AOI_{1,f}=AOI_{2,f}$ and $AOI_{1,b}=AOI_{2,b}$ with $AOI_{1,f}+AOI_{1,b}=180°$ and $AOI_{2,f}+AOI_{2,b}=180°$.
Figure 7:
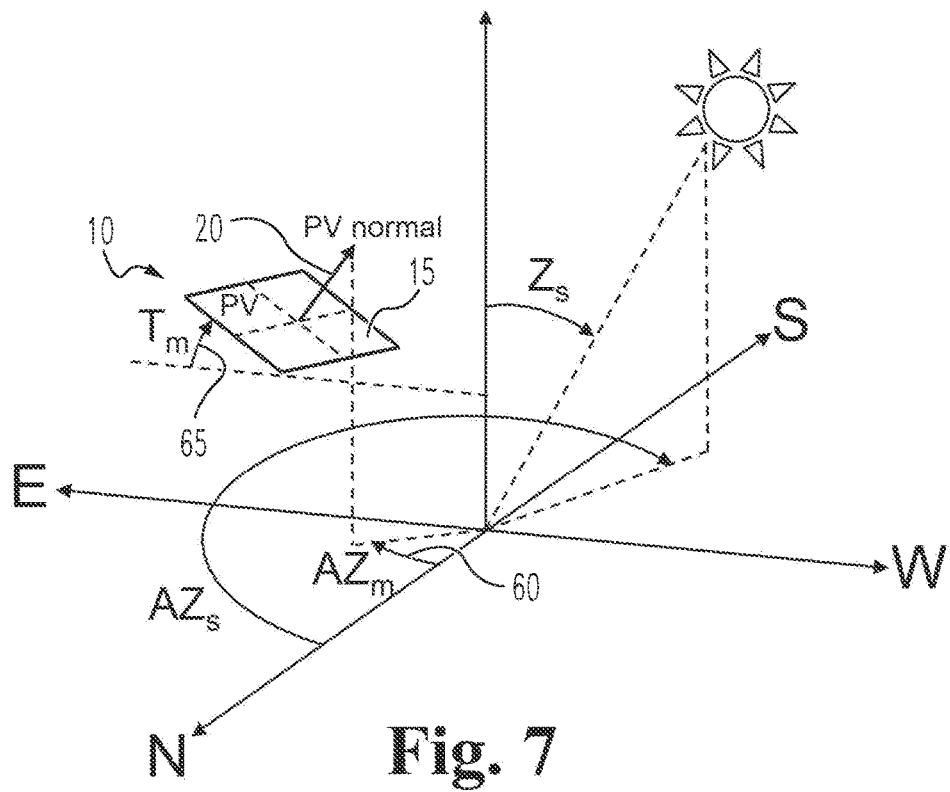
FIG. 7 shows coordinate system to define angle of incidence in Eqn. 1.
Figure 2:
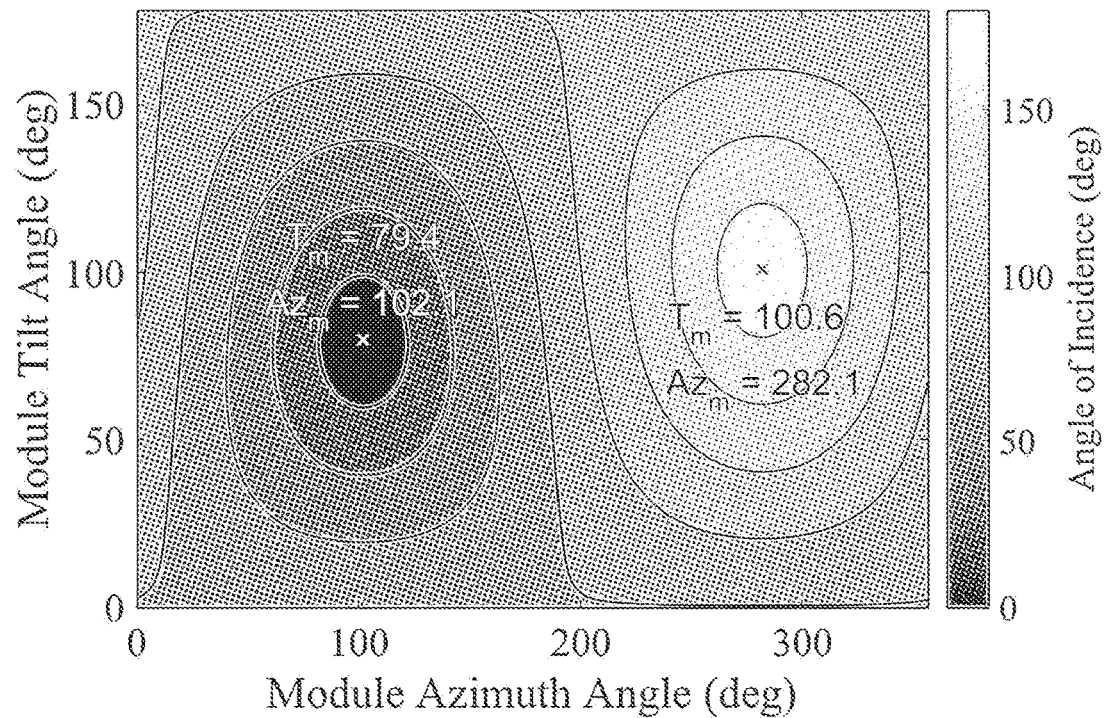
FIG. 2 shows example of calculated AOI with minimum ('x') values marked (AOI of 0° is equivalent to AOI of 180°). $T_m$, and $Az_m$ are marked with at the 'x' for the two rotation axes of module tilt and module active front and reverse faces. Multiple options for ideal AOI of 90° are available to support the first and fourth embodiments. During off-growing season, the lowest AOI between solar rays and panel active face normal ('x') would be used to maximize power production.
Figure 2:
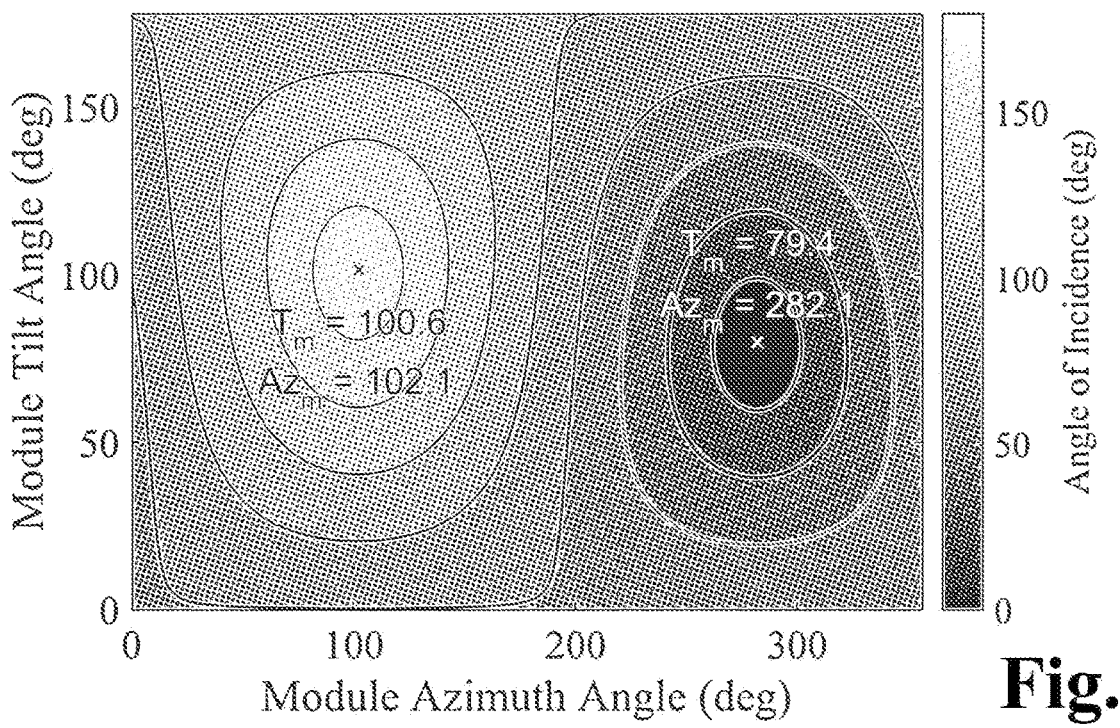
Figure 2:
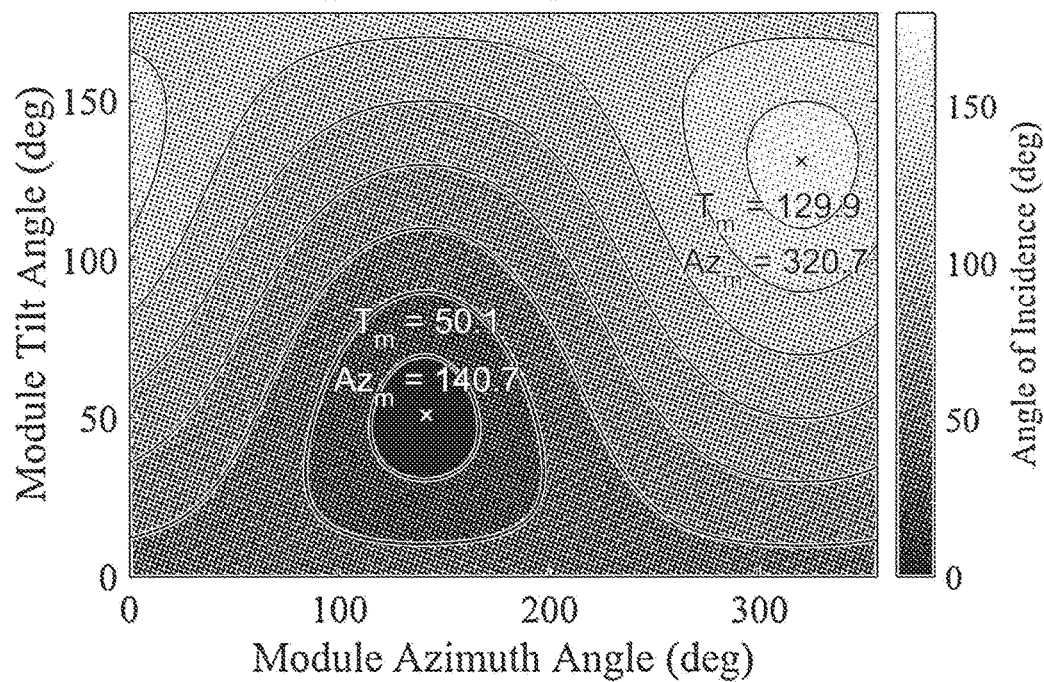
Figure 2:
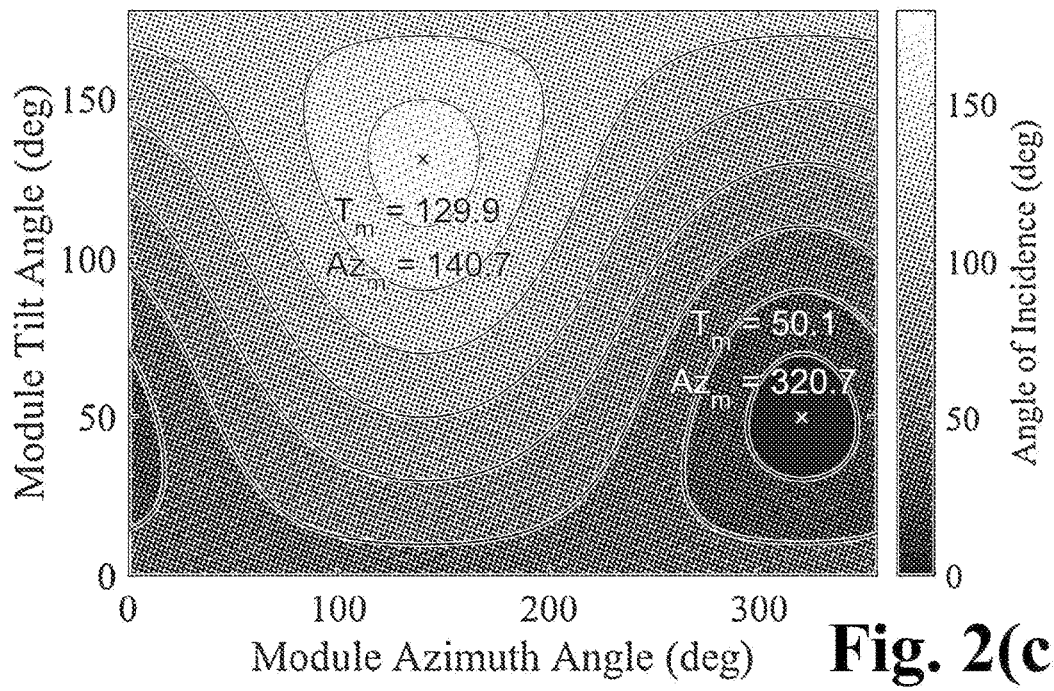
Figure 2:
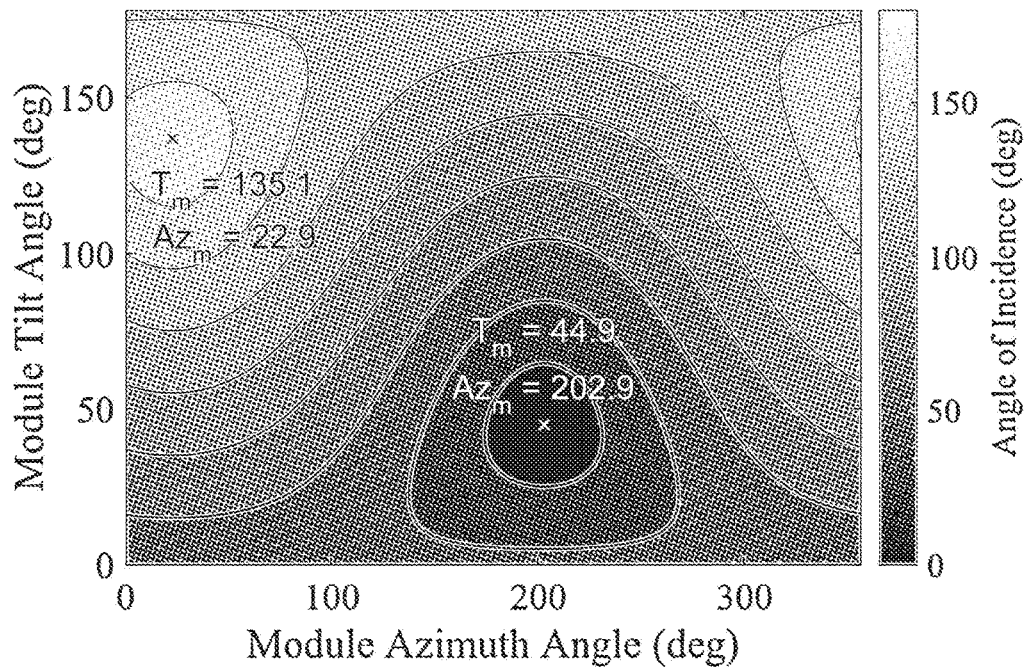
Figure 2:
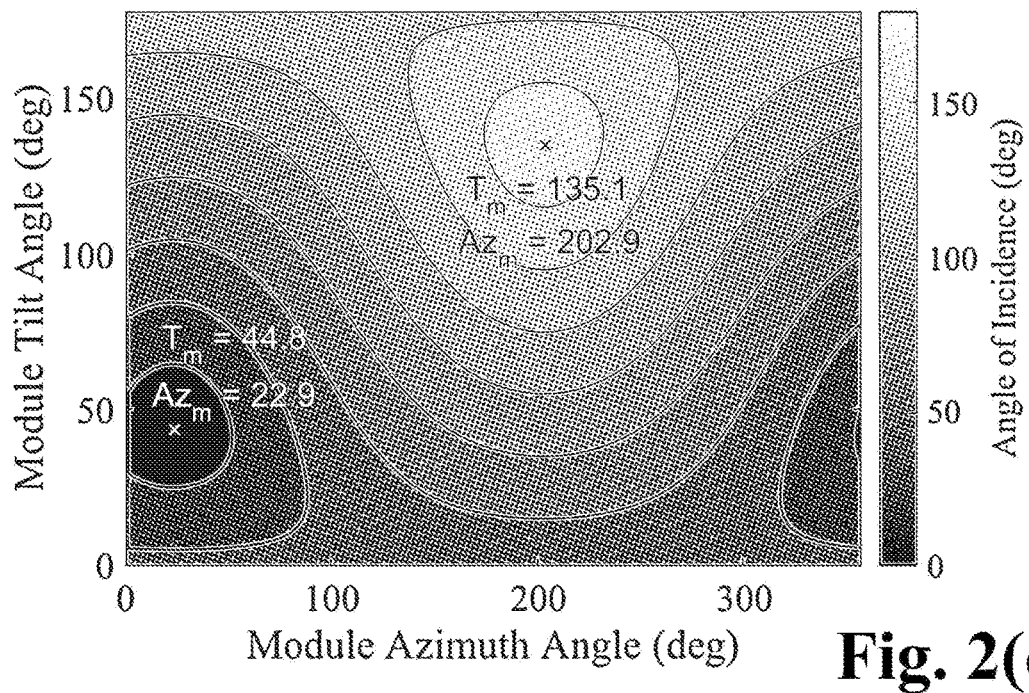
Figure 3:
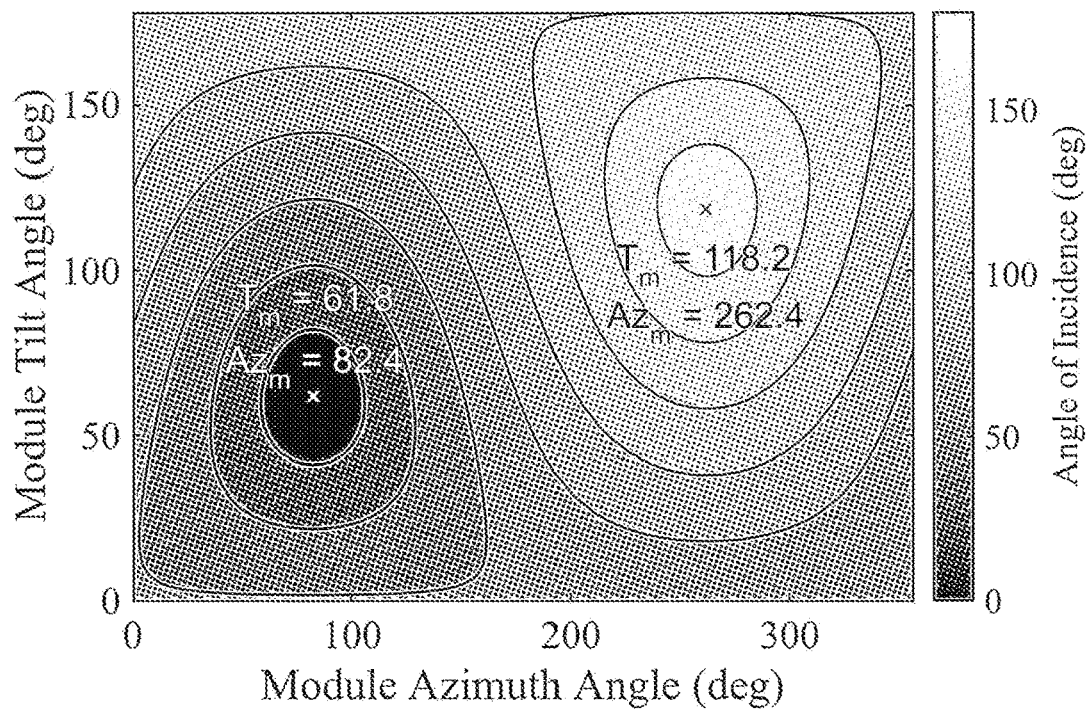
FIG. 3 shows example of calculated AOI with minimum ('x') values marked (AOI of 0° is equivalent to AOI of 180°). $T_m$, and $Az_m$ are marked with at the 'x' for the two rotation axes of module tilt and module active front and reverse faces. Multiple options for ideal AOI of 90° are available to support the first and fourth embodiments. During off-growing season, the lowest AOI between solar rays and panel active face normal ('x') would be used to maximize solar irradiance on the ground.
Figure 3:
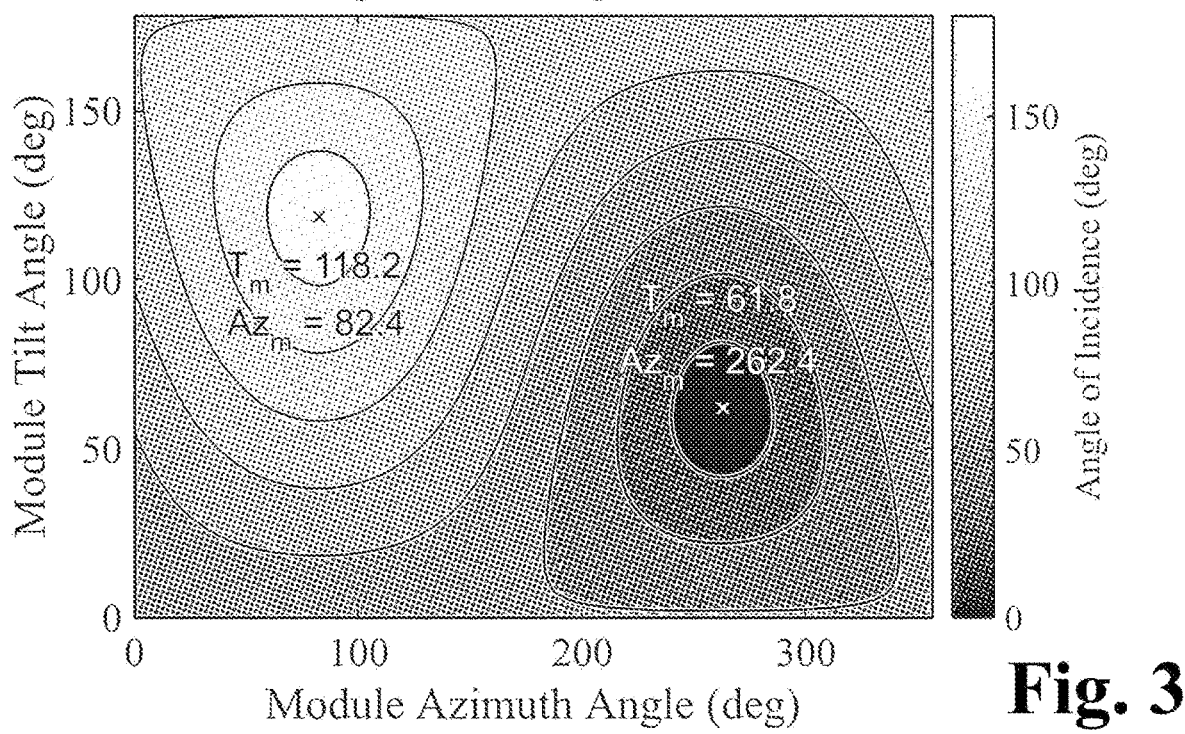
Figure 3:
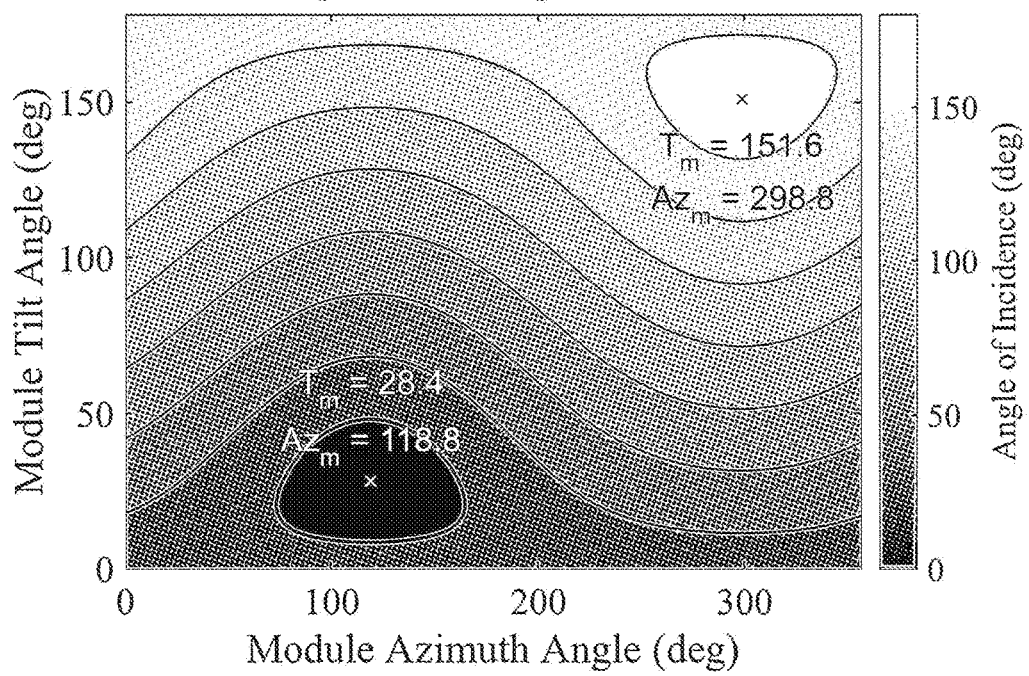
Figure 3:
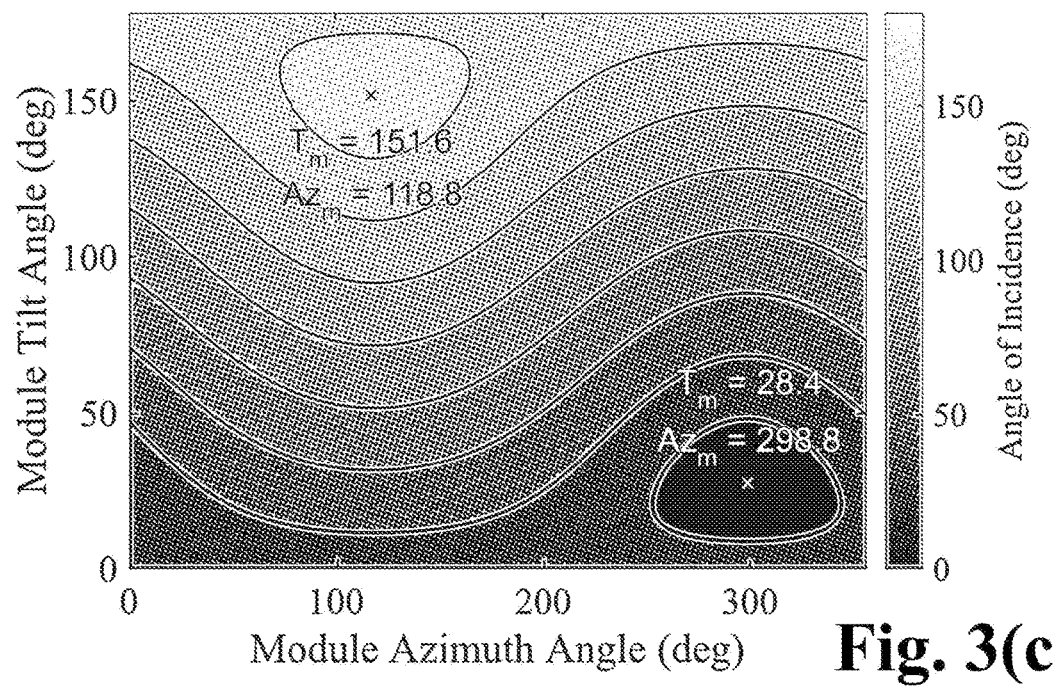
Figure 3:
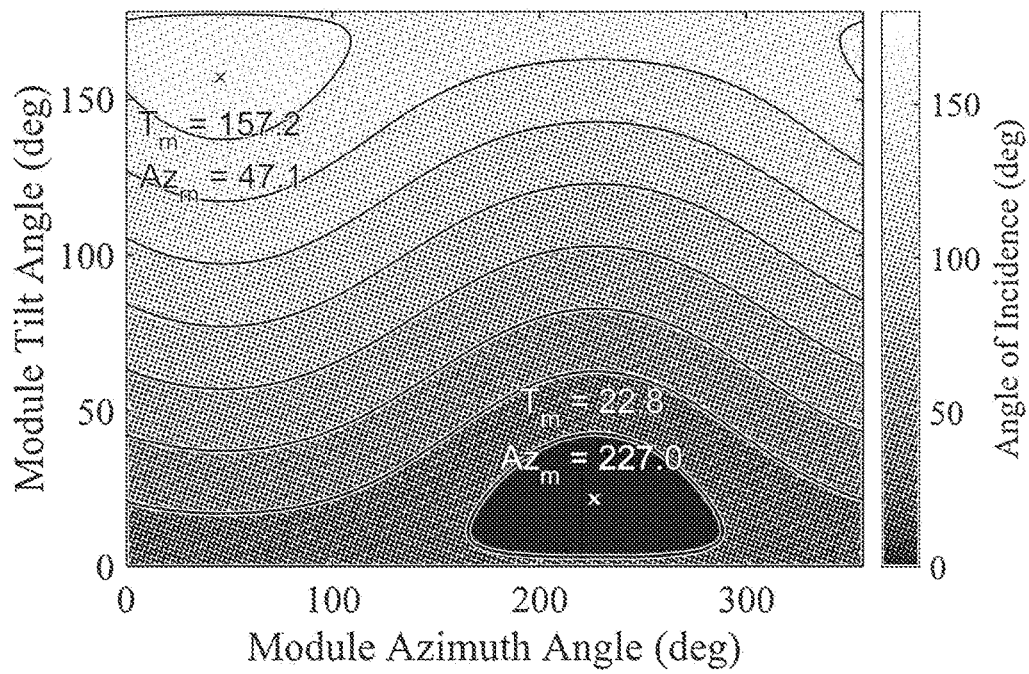
Figure 3:
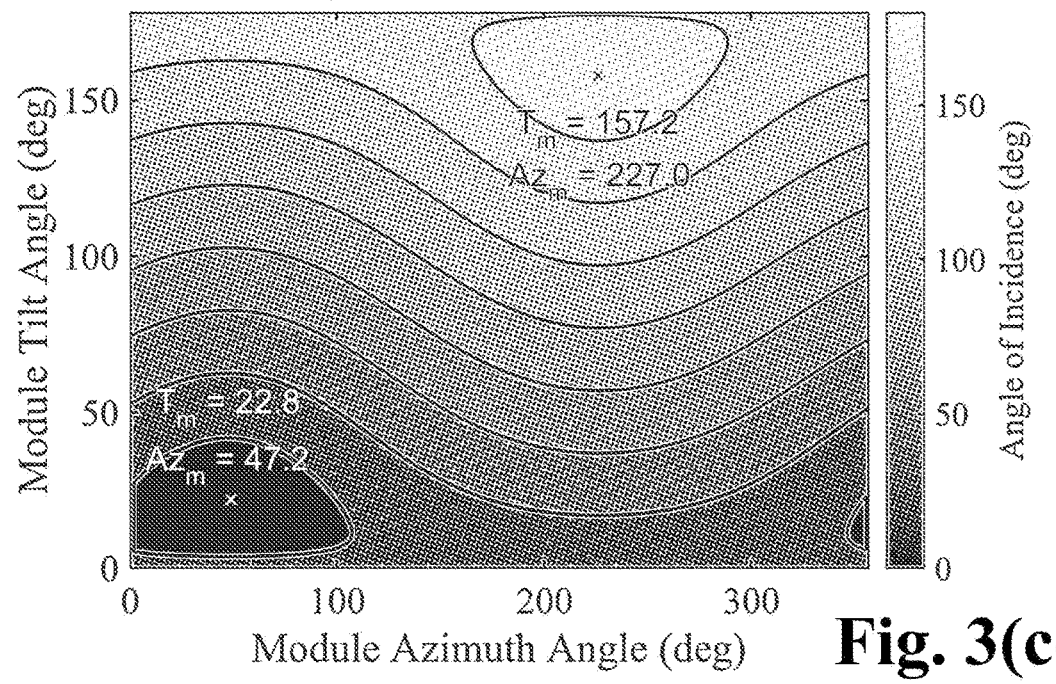
Figure 4:
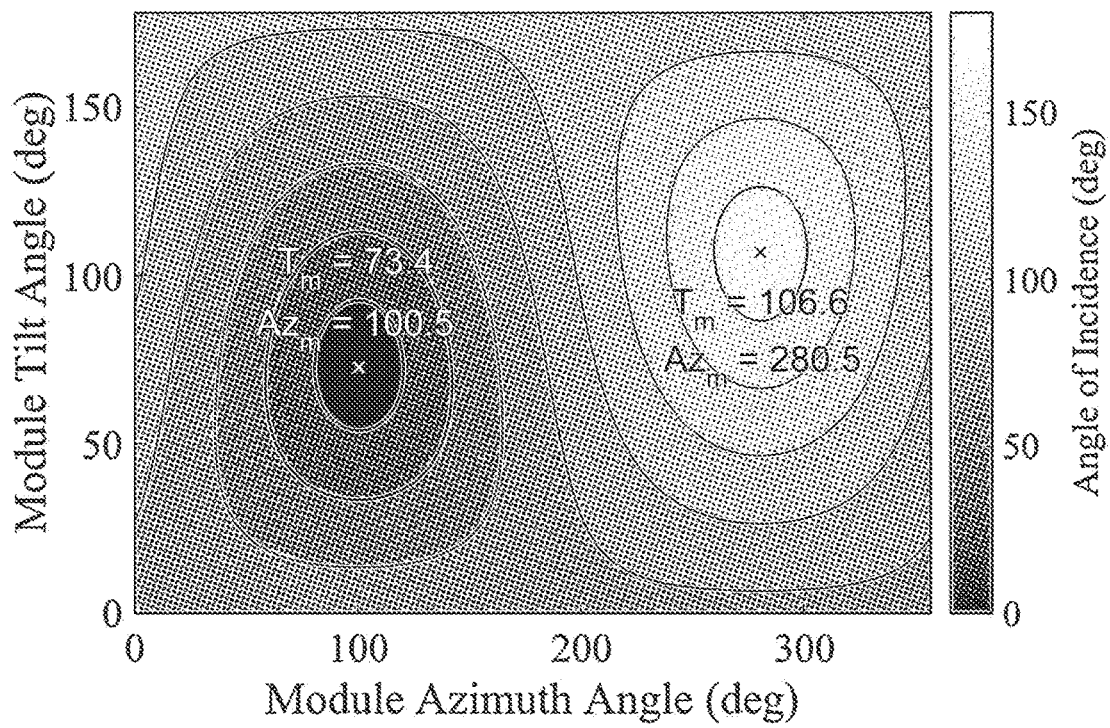
FIG. 4 shows example of calculated AOI with minimum ('x') values marked (AOI of 0° is equivalent to AOI of 180°). $T_m$, and $Az_m$ are marked with at the 'x' for the two rotation axes of module tilt and module active front and reverse faces. Multiple options for ideal AOI of 90° are available to support the first and fourth embodiments. During off-growing season, the lowest AOI between solar rays and panel active face normal ('x') would be used to maximize solar irradiance on the ground.
Figure 4:
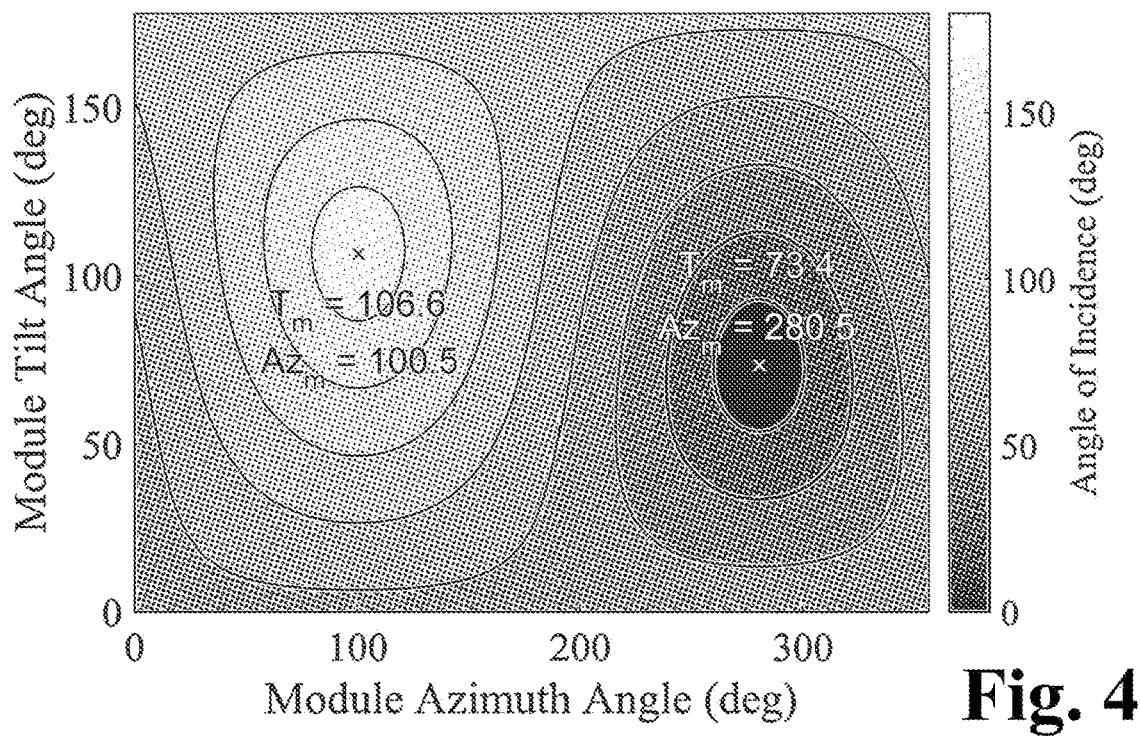
Figure 4:
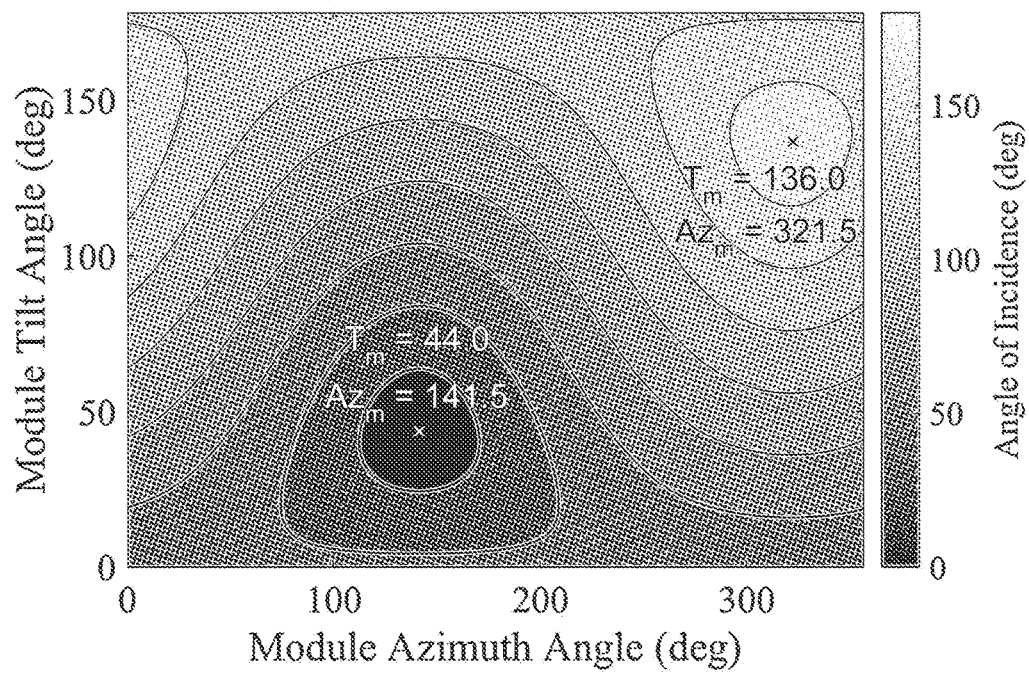
Figure 4:
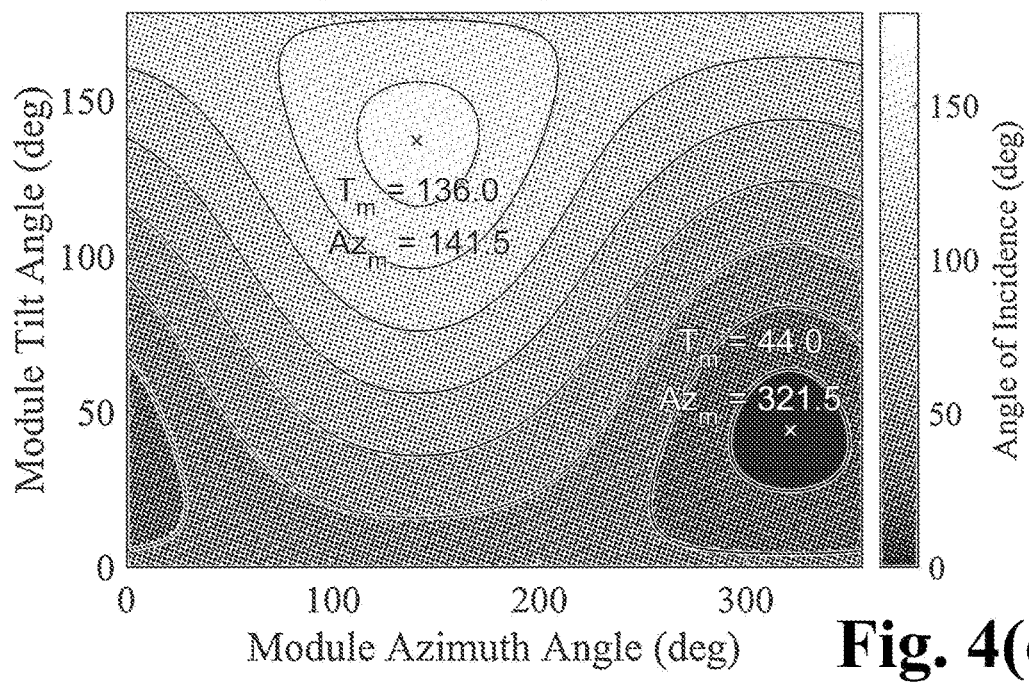
Figure 4:
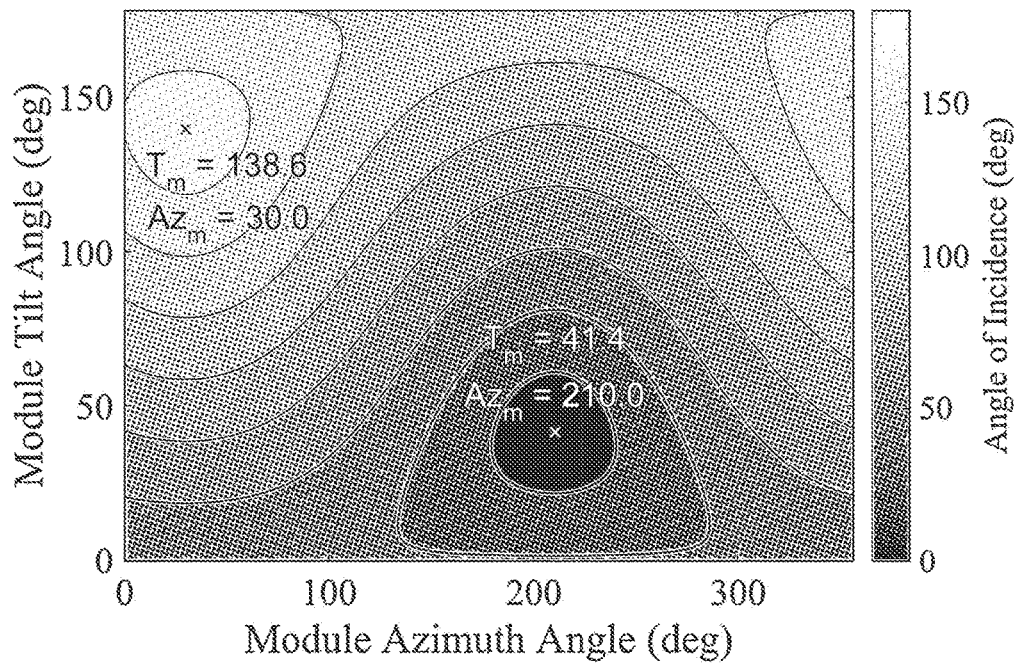
Figure 4:
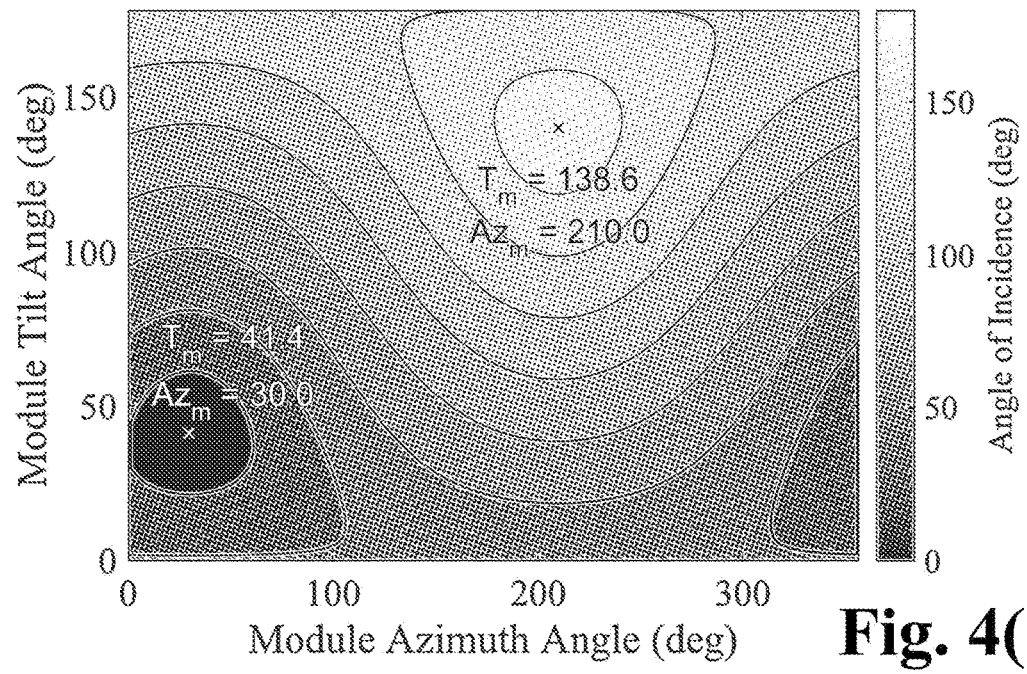
Figure 5:
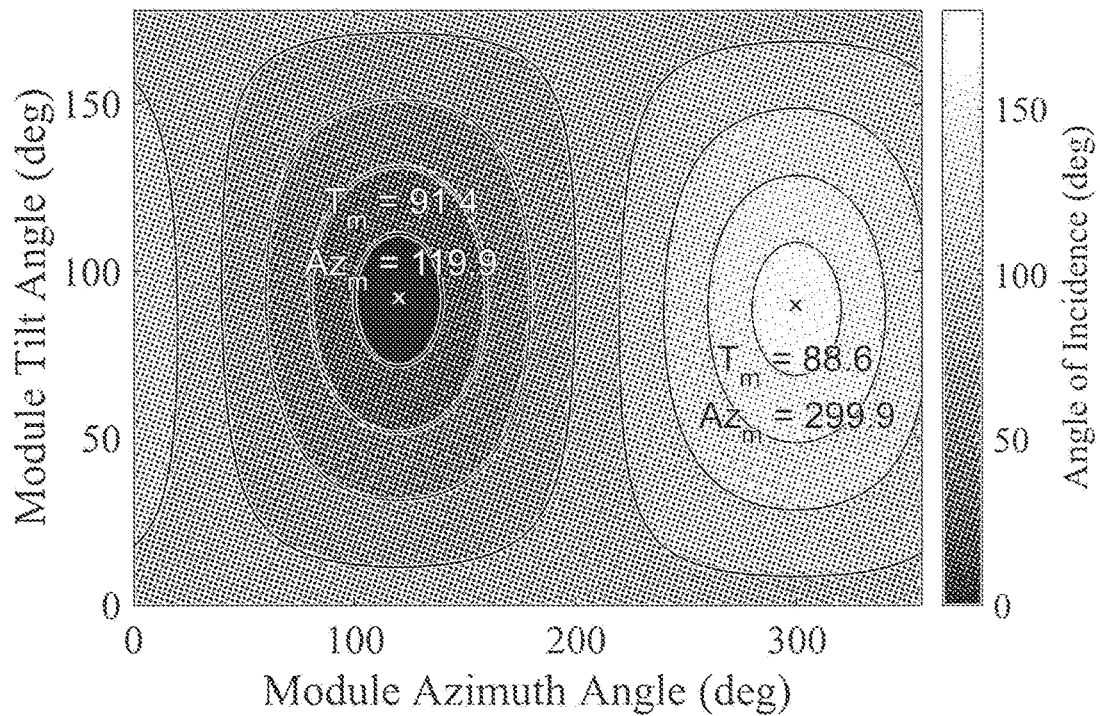
FIG. 5 shows example of calculated AOI with minimum ('x') values marked (AOI of 0° is equivalent to AOI of 180°). $T_m$, and $Az_m$ are marked with an 'x' for the two rotation axes of module tilt and module active front and reverse faces. Multiple options for ideal AOI of 90° are available to support the first and fourth embodiments. During off-growing season, the lowest AOI between solar rays and panel active face normal ('x') would be used to maximize solar irradiance on the ground.
Figure 5:
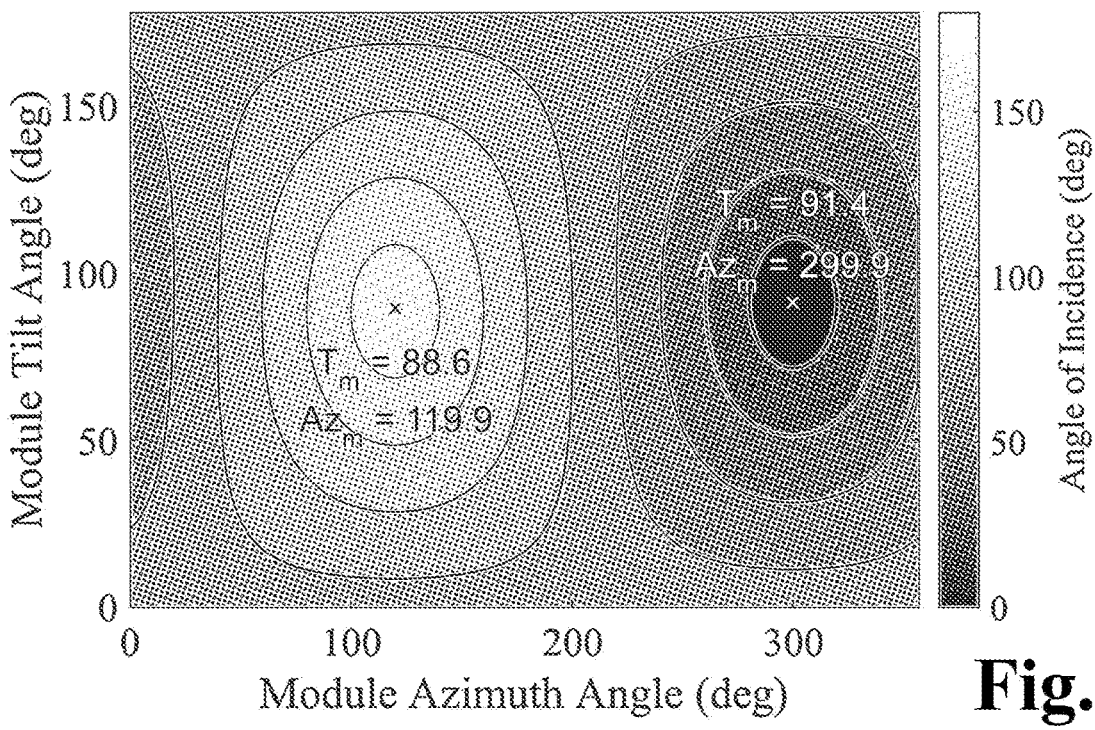
Figure 5:
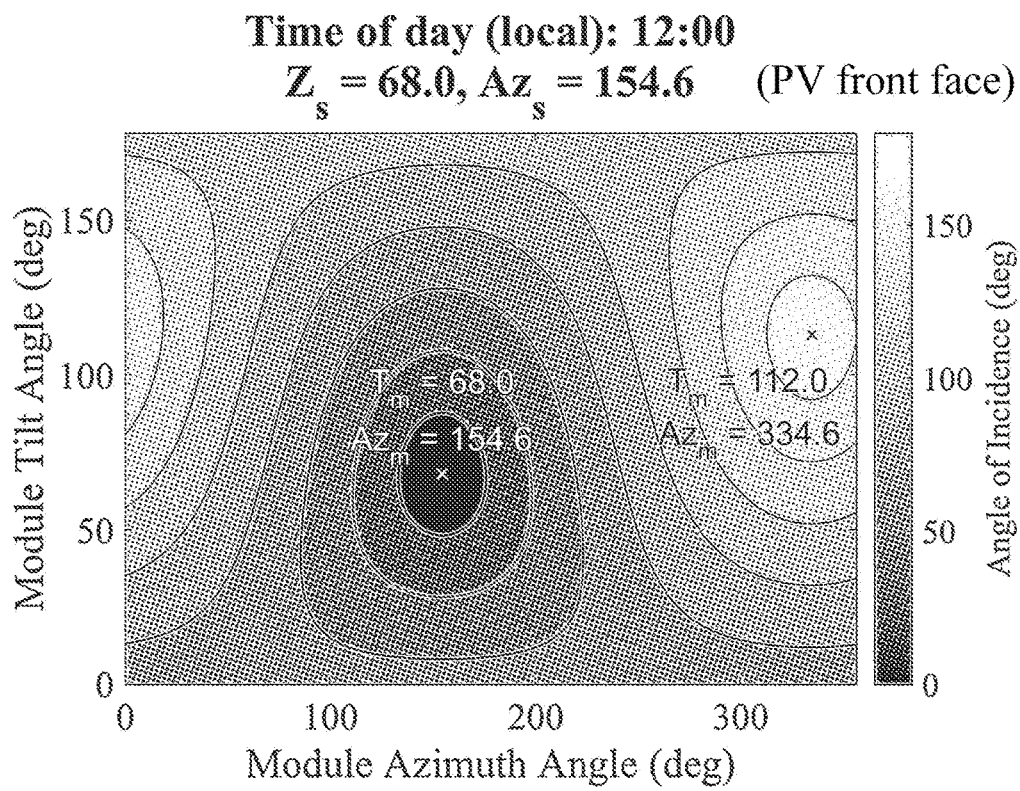
Figure 5:
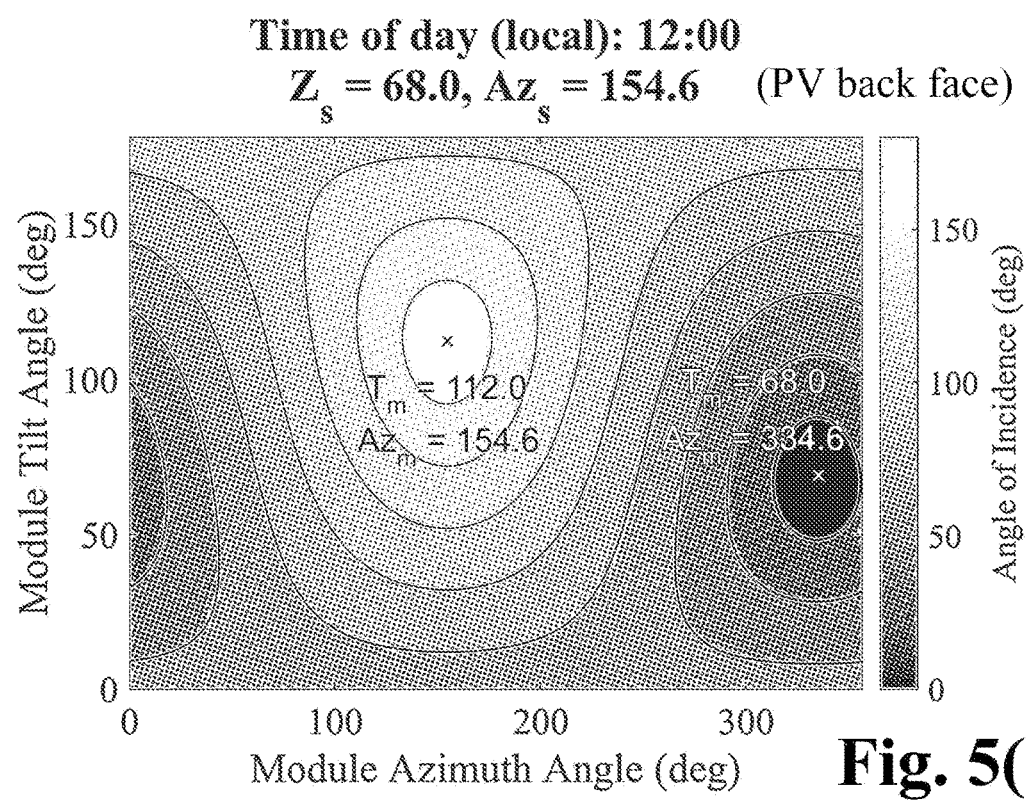
Figure 5:
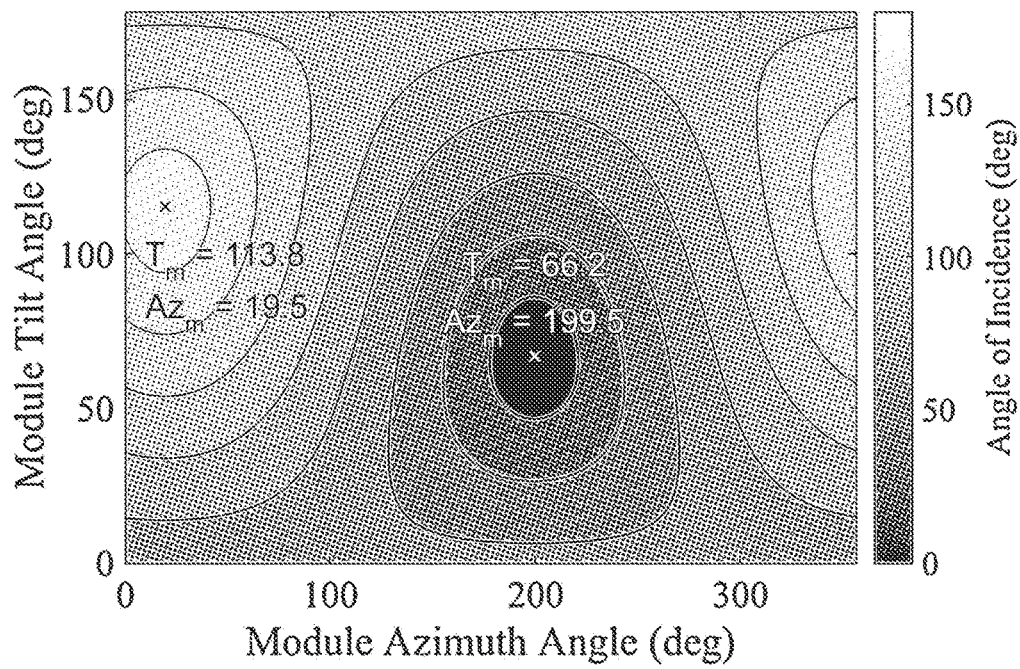
Figure 5:
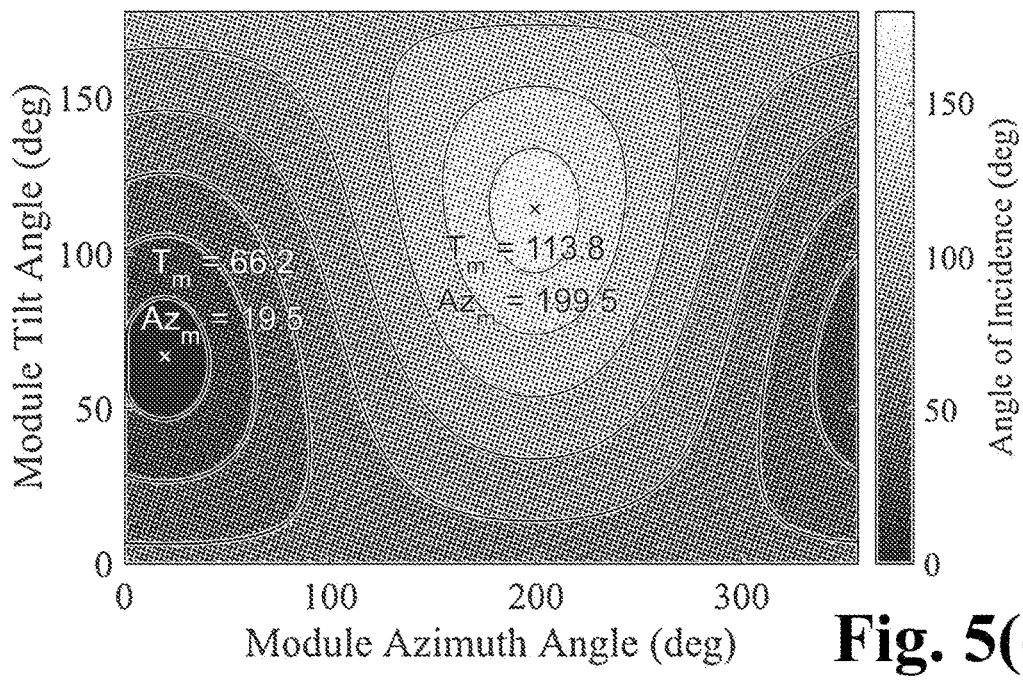
Figure 6A:
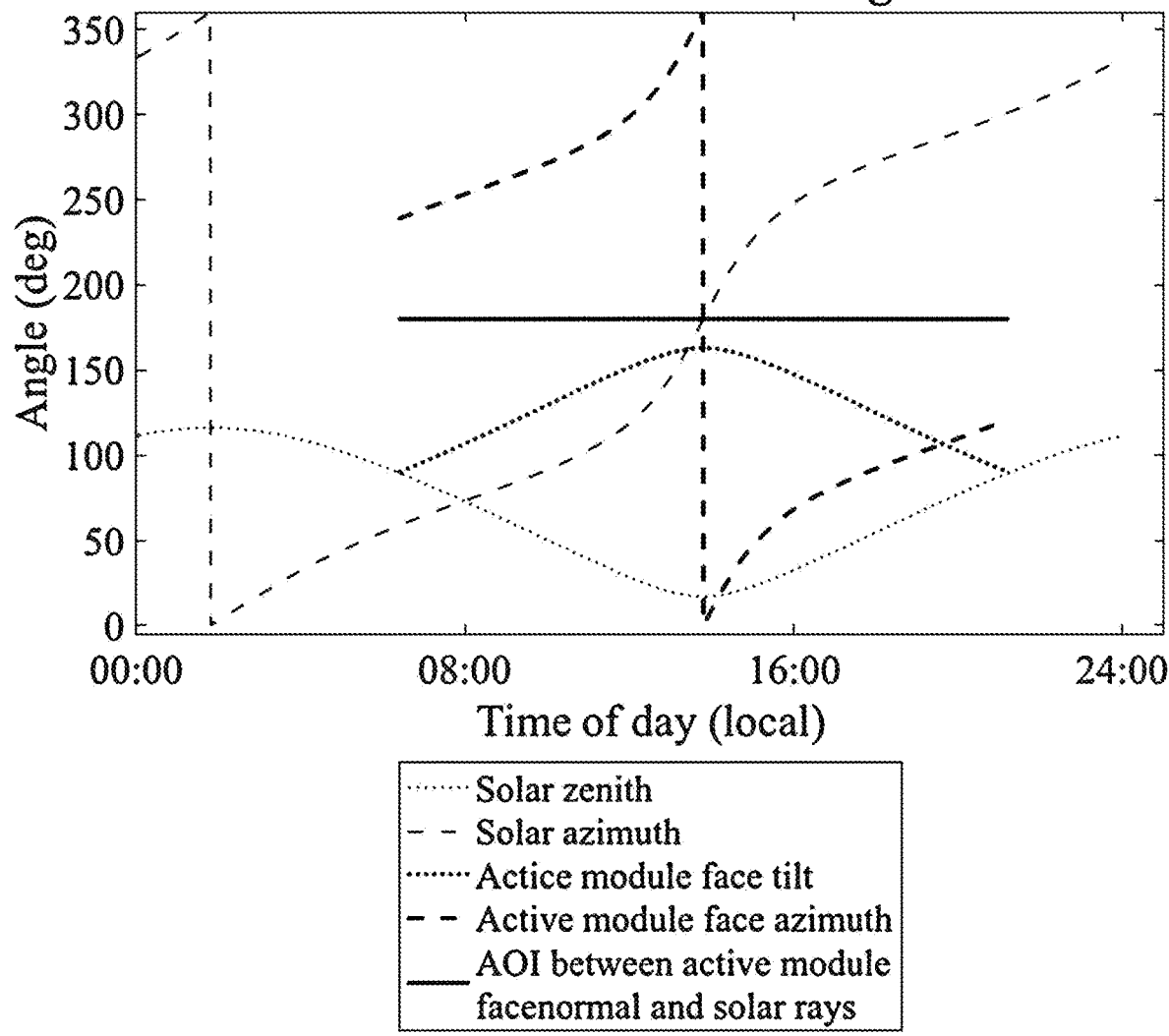
FIG. 6A shows an example of an ideal (90°) AOI tracking algorithm for minimum shadowing during growing season with two rotation axes with full degree of freedom to demonstrate a tracking algorithm for the first embodiment for daylight hours.
Figure 6B:
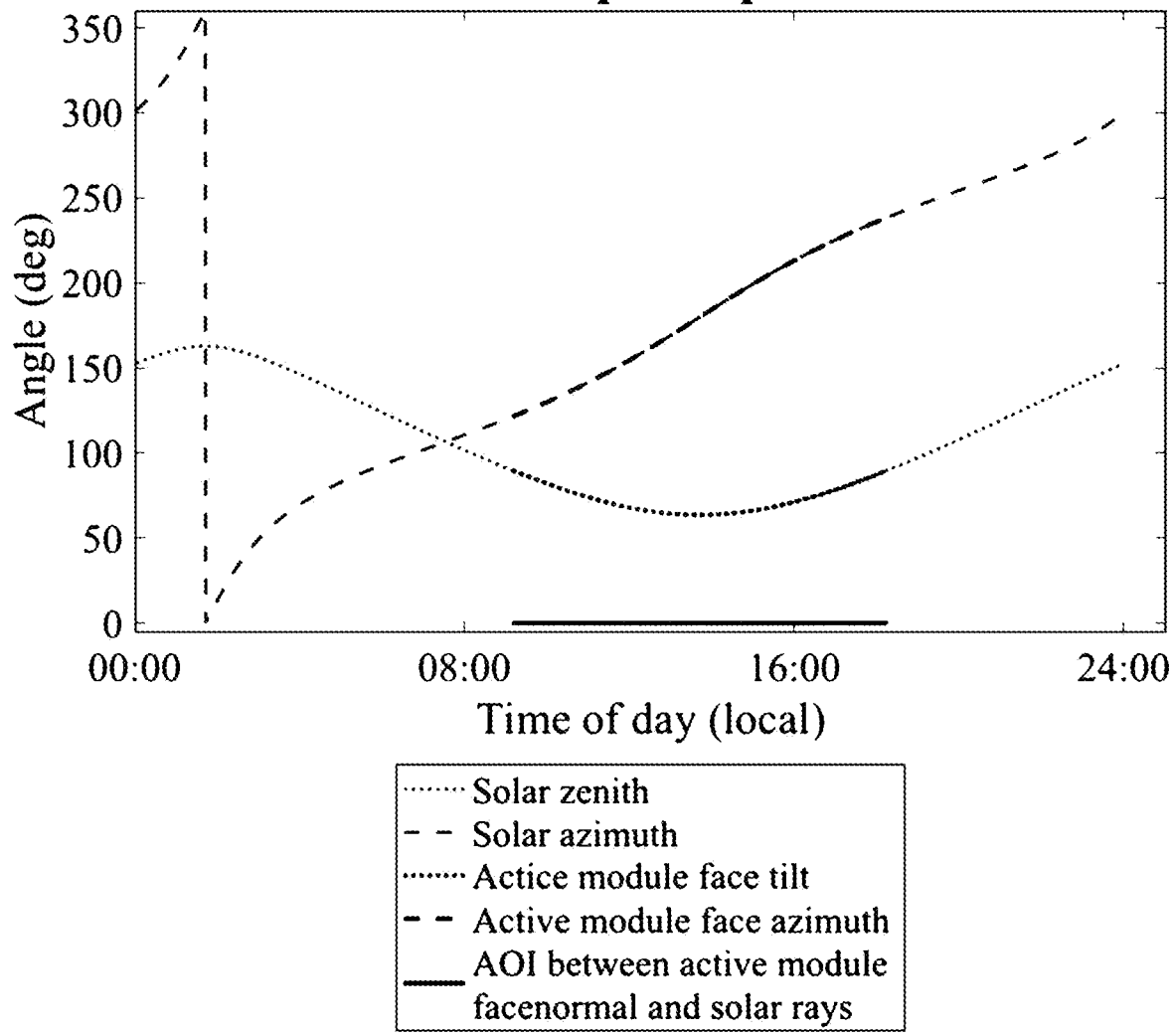
FIG. 6B shows an example of ideal (0°) AOI tracking algorithm for maximum power generation during the off-season with two rotation axes with full degree of freedom to demonstrate a tracking algorithm for the eleventh embodiment for daylight hours.

An AOI of 0° indicates that the PV module face is directly facing the solar rays, an AOI of 90° indicates the PV module face is perpendicular to the solar rays, and an AOI above 90° indicates that the module face is turned away from the direct field of view of the solar rays such that the solar rays are incident on the reverse face (FIG. 1). For the purposes of this disclosure, shadowing effects are equivalent for equivalent values of AOI on the front and reverse faces (i.e. a calculated AOI of 120° indicates an AOI of 60° on the reverse face and has the same shadowing effects as an AOI of 60° on the front face). For clarity, we will refer to AOI with respect to the front face. The front face is defined as the face that has active PV to capture solar photons and produce electricity. When the PV panel is monofacial, the front face is the active face of the PV module. When the PV panel is bifacial, then the reverse face also collects solar photons and generates electricity. Alternatively, one may install two monofacial PV panels; one in the front and one in the back. In this case, as well as when bifacial modules are used, one may consider AOI with respect to either the front or reverse face as both faces are equivalent in terms of shadowing and electricity production. Examples of AOI for two cases of $AZ_s = AZ_m$ and $AZ_s - Az_m = 90$ for all solar zenith and PV module tilt angles is plotted in FIG. 9 and FIG. 10.

Total radiation available to the system is given by:

$$E_{tot} = \int_{t_1}^{t_2} I_{GHI}(t) A_{field} dt \quad (2)$$

where:
$I_{GHI}$=Global horizontal irradiance
$A_{field}$=Area of field

The intercepted radiation by the PV module for a given AOI over a time period from $t_1$ to $t_2$ is given by the equations:

$$E_{PV,dir}(t) = \int_{t_1}^{t_2} I_{DNI}(t) A_{PV} \sin(AOI(t)) \alpha(AOI) dt \quad (3)$$

$$E_{PV,dif} = \int_{t_1}^{t_2} I_{DHI}(t) A_{PV} f(AOI) \alpha(AOI) dt \quad (4)$$

$$E_{PV} = E_{PV,dir} + E_{PV,dif} \quad (5)$$

where:
$E_{PV}$=Energy intercepted by the PV module
$E_{PV,dir}$=Energy intercepted by the PV module from direct solar rays
$E_{PV,dif}$=Energy intercepted by the PV module from diffuse solar rays $I_{DNI}$=Direct normal irradiance
$I_{DHI}$=Diffuse horizontal irradiance
$A_{PV}$=Area of a PV module face
AOI=Angle of incidence of direct solar rays on a PV module face
$\alpha$=Angular-dependent absorption coefficient of PV module
f=Fraction of diffuse irradiance intercepted by the PV module Radiation available to the field is given by $$E_{field} = E_{tot} - E_{PV} - E_{r,atmosphere} \quad (6)$$

where:
$E_{r,atmosphere}$=Reflected radiation from the PV panels into the atmosphere. Radiation that is transmitted through the panels and incident on the field and radiation that is reflected off the panels and incident on the field through mutual reflections is captured in the Etot term. We note that reflected radiation/transmitted radiation through the PV panels that is incident on the ground is a small fraction of $E_{field}$ for the systems proposed, and quantification of these values is not necessary for the purposes of this invention. We also note that $E_{r,atmosphere}$ is negligible for many PV panels, and therefore power calculations are done assuming 100% absorption of radiation incident on the PV panels.

For AOI to be 90°, from Eqn. 1, we find $$\cos(T_m)\cos(Z_s) + \sin(T_m)\sin(Z_s)\cos(AZ_s - AZ_m) = 0$$

For given values of solar position, $Z_s$ and $AZ_s$, one can calculate values of $T_m$ and $AZ_m$ that would satisfy the above equation.

Maximizing the angle of incidence up to 90° between the solar ray and the photovoltaic, PV, module active face normal minimizes the intercepted radiation by the PV module for most cases. Cases may exist where maximization of AOI up to 90° does not minimize $E_{PV}$. These may be in regions with high fractions of diffuse light that is not maximal around the solar disc. For the purposes of this invention, we are interested in the maximization of AOI up to 90° and will take it to be synonymous with the minimization of $E_{PV}$. For the purposes of this invention, reference to maximizing AOI means maximizing AOI up to 90°.

In terms of power production for these systems, for shadow minimization orientations with bifacial panels primarily facing E-W as in traditional bifacial PV systems, we expect similar power output. For bifacial PV systems that minimize shadowing such that AOI is 90° at all times, only diffuse light is available for electricity production. Reasonably assuming 100% of diffuse light is incident on the bifacial panels, all power is generated using diffuse light. In many regions, this can be 40% or more of the total irradiance. Conventional bifacial PV systems ideally capture 100% of diffuse light, as well, as a fraction of direct light. For a vertical E-W facing bifacial system, the power generated by bifacial panels from diffuse light can be upwards of 60% of the total power generated (calculated for average GHI of 250 W/m² on Jun. 15, 2019 in West Lafayette, Ind. with a diffuse fraction of 40%). To compare to conventional fixed-tilt monofacial south-facing systems, in this highly diffuse region bifacial panels actually outperform monofacial panels by 8% absolute higher power generation. We see that for shadow minimization PV systems, expected power output is at least half the expected power for systems optimized for power production for highly diffuse sunlight regions such as the U.S. Midwest where significant agricultural activity occurs. Despite this power loss, minimization of shadows to effectively zero shadowing in the optimized case should have zero effect on crop growth, thus adding electricity production to a farmland while maintaining 100% crop yield and enabling food and electricity co-production.

In general, the embodiments enumerated below relate to variations of a method for generating electric power on active use farmland while minimizing shadow disruption, including the steps of installing a photovoltaic module having a first generally planar photovoltaic face, a tilt axis, and an azimuth axis, wherein the photovoltaic module casts a shadow on active use farmland; and automatically pivoting the photovoltaic module about at least one respective axis to minimize the shadow on active use farmland.

In a first embodiment, the present novel technology relates to an installation of the PV module system 5 on agricultural or farmland to minimize radiation intercepted by the PV module 10 continuously throughout the day. As shown in FIG. 8, the PV module 10 (width w, length l, and thickness t) is installed in a dual-axis tracking configuration such that both axes of rotation, tilt 25 and azimuth 30, have complete degree of freedom. The PV module 10 is oriented dynamically throughout the day such that the module active face 15 normal 20 is perpendicular to the direction of direct solar rays due to the adjustment of the module active face normal azimuth angle $AZ_m$ 60 and the module active face tilt angle $T_m$ 65 from the horizontal. Minimizing $E_{PV}$ is a maximization of the AOI between the solar ray and the photovoltaic module active face normal 20 such that the AOI is 90°. This is possible at all times of day with full rotation in both azimuth and tilt axes 30, 25. Rotation is accomplished by energization of a tilt motor 40 and/or azimuth motor 45, each operationally connected to the module 10 and engageable to pivot the module about a respective tilt axis 25 and/or azimuth axis 30. The motors 25, 30 are typically likewise connected to an electronic controller 50 which may be programmed with an appropriate control algorithm, and connected to a solar sensor 55 (which may be the PV panel 15 or a separate solar energy detector). Alternately, information regarding the position of the sun at any given date and time may be programmed into the electronic controller 50. Thus, the resulting line shadow from each PV module 10 is angularly dependent on the tilt angle and the panel thickness, only, at all times of day. To find the maximum angle of incidence up to 90°, a 2D optimization of PV module tilt, $T_m$ 65, and PV module azimuth, $AZ_m$ 60, using Eqn. 1 is helpful given the projected solar position in a given location for a given time period obtained using a solar positioning algorithm. A range of tilt and azimuth combinations will provide the same minimal shadowing. Therefore, the tilt and azimuth angles should be chosen for all time steps that maximize power production and are physically realizable.

In the second embodiment, the present invention is an installation of the PV module on a farmland with one axis of rotation, the azimuth, with full degree of freedom, and one fixed axis, the tilt. The goal is to minimize radiation intercepted by the PV module active face continuously throughout the day. In this configuration, the intercepted radiation is minimized by dynamically orienting the panel azimuth angle to maximize the angle of incidence between the solar ray and the photovoltaic, module active face normal for a fixed PV module tilt. To find the maximum angle of incidence up to 90°, Eqn. 1 is to be used with a given projected solar position in a given location for a given time period obtained using a solar positioning algorithm. To find the optimal azimuth-tracking algorithm for the optimal fixed panel tilt that minimizes radiation intercepted by the PV module, we propose minimizing Eqn. 5 for the time period of interest using 2D optimization with Tz and AZz as variables. PV module tilt, Tz, is to be fixed for the time period at a given geographical location, and then 1D optimization to minimize $E_{PV}$ can be employed with $AZ_m$ as the only independent variable. A range of tilt and azimuth combinations will provide the same minimal shadowing. Therefore, the tilt and azimuth angles should be chosen for all time steps that maximize power production and are physically realizable.

In the third embodiment, the present invention is an installation of the PV module with one axis of rotation, the tilt, with full degree of freedom, and one fixed axis, the azimuth. In this configuration, the shadow is minimized by dynamically orienting the tilt angle to minimize $E_{PV}$ (Eqn. 3-5). The PV module active face azimuth angle, $AZ_m$, is fixed to minimize the total irradiance loss on the field integrated throughout the day. To find the optimal tilt-tracking algorithm for the optimal fixed panel azimuth that minimizes radiation intercepted by the PV module, we propose minimizing Eqn. 5 for the time period of interest using 2D optimization with $T_m$ and $AZ_m$ as variables. Eqn. 1 is to be used with a given projected solar position in a given location for a given time period obtained using a solar positioning algorithm. PV module azimuth, $AZ_m$, is to be fixed for the time period, and then 1D optimization to minimize $E_{PV}$ (Eqn. 3-5) can be employed with :; as the only independent variable to determine the tilt-tracking algorithm for the time period of interest. To find the optimal $AZ_m$, the total $E_{PV}$ integrated over the entire time period of interest at a given geographical location should be minimized. A range of tilt and azimuth combinations will provide the same minimal shadowing. Therefore, the tilt and azimuth angles should be chosen for all time steps that maximize power production and are physically realizable.

In the fourth embodiment, the present invention is the installation of the PV module with two axes of rotation, the tilt and the azimuth axes, with limited degrees of rotation. In these cases, when the maximum rotation angle is reached, the PV module should be dynamically oriented within the range of rotation angles in both axes to minimize $E_{PV}$ (Eqn. 3-5) for the time period of interest at a given geographical location. A range of tilt and azimuth combinations will provide the same minimal shadowing. Therefore, the tilt and azimuth angles should be chosen for all time steps that maximize power production and are physically realizable.

In the fifth embodiment, the present invention is the installation of the off-axis vertical PV module with a fixed tilt angle and fixed azimuth angle to achieve minimal radiation loss over the region of interest on the field integrated over a period of time. To achieve this, $E_{PV}$ (Eqn. 3-5) must be minimized over the time period of interest. To find the optimal tilt and azimuth angles, we propose minimizing $E_{PV}$ for the time period of interest at a given geographical location using 2D optimization with $T_m$ and $AZ_m$ as variables. A range of tilt and azimuth combinations will provide the same minimal shadowing. Therefore, the tilt and azimuth angles should be chosen for all time steps that maximize power production and are physically realizable.

In the sixth embodiment, the present invention is the installation of a bifacial PV module on a farmland to minimize radiation intercepted by the PV module continuously throughout the day. The PV module is installed in a dual-axis tracking configuration such that both axes of rotation, tilt and azimuth, have complete degree of freedom. The PV module is oriented dynamically throughout the day such that the module active face normal is perpendicular to the direction of direct solar rays due to the adjustment of the module active face normal azimuth angle $AZ_m$ and the module active face tilt angle $T_m$ from the horizontal. Minimizing $E_{PV}$ is a maximization of the AOI between the solar ray and the photovoltaic module active face normal such that the AOI is 90°. This is possible at all times of day with full rotation in both azimuth and tilt axes. Thus, the resulting line shadow from each PV module is angularly dependent on the tilt angle and the panel thickness, only, at all times of day. To find the maximal angle of incidence, a 2D optimization of PV module tilt, $T_m$, and PV module azimuth, $AZ_m$, using Eqn. 1 is necessary given the projected solar position in a given location for a given time period obtained using a solar positioning algorithm. A bifacial module is expected to output more power per unit land area compared to a monofacial PV module. A range of tilt and azimuth combinations will provide the same minimal shadowing. Therefore, the tilt and azimuth angles should be chosen for all time steps that maximize power production and are physically realizable.

In the seventh embodiment, the present invention is an installation of the bifacial PV module on a farmland with one axis of rotation, the azimuth, with full degree of freedom, and one fixed axis, the tilt. The goal is to minimize radiation intercepted by the PV module continuously throughout the day. In this configuration, the intercepted radiation is minimized by dynamically orienting the panel azimuth angle to maximize the angle of incidence between the solar ray and the photovoltaic module face normal for a fixed PV module tilt. To find the maximum angle of incidence, Eqn. 1 is to be used with a given projected solar position in a given location for a given time period obtained using a solar positioning algorithm. To find the optimal azimuth-tracking algorithm for the optimal fixed panel tilt that minimizes radiation intercepted by the PV module, we propose minimizing Eqn. 5 for the time period of interest using 2D optimization with $T_m$ and $AZ_m$ as variables. PV module tilt, $T_m$, is to be fixed for the time period at a given geographical location, and then 1D optimization to minimize $E_{PV}$ can be employed with $AZ_m$ as the only independent variable. A bifacial module is expected to output more power per unit land area compared to a monofacial PV module. A range of tilt and azimuth combinations will provide the same minimal shadowing. Therefore, the tilt and azimuth angles should be chosen to maximize power production at all times while being physically realizable.

In the eighth embodiment, the present invention is an installation of the bifacial PV module on a farmland with one axis of rotation, the tilt, with full degree of freedom, and one fixed axis, the azimuth. In this configuration, the shadow is minimized by dynamically orienting the tilt angle to minimize $E_{PV}$ (Eqn. 3-5). The PV azimuth angle, $AZ_m$, is fixed to minimize the total irradiance loss on the field integrated throughout the day. To find the optimal tilt-tracking algorithm for the optimal fixed panel azimuth that minimizes radiation intercepted by the PV module, we propose minimizing Eqn. 5 for the time period of interest using 2D optimization with $T_m$ and $AZ_m$ as variables. Eqn. 1 is to be used with a given projected solar position in a given location for a given time period obtained using a solar positioning algorithm. PV module azimuth, $AZ_m$, is to be fixed for the time period, and then 1D optimization to minimize $E_{PV}$ (Eqn. 3-5) can be employed with $T_m$ as the only independent variable to determine the tilt-tracking algorithm for the time period of interest. To find the optimal $AZ_m$, the total $E_{PV}$ integrated over the entire time period of interest at a given geographical location should be minimized. A bifacial module is expected to output more power per unit land area compared to a monofacial PV module. A range of tilt and azimuth combinations will provide the same minimal shadowing. Therefore, the tilt and azimuth angles should be chosen for all time steps that maximize power production and are physically realizable.

In the ninth embodiment, the present invention is the installation of the bifacial PV module with two axes of rotation, the tilt and the azimuth axes, with limited degrees of rotation. In these cases, when the maximum rotation angle is reached, the PV module should be dynamically oriented within the range of rotation angles in both axes to minimize $E_{PV}$ (Eqn. 3-5) for the time period of interest at a given geographical location. A bifacial module is expected to output more power per unit land area compared to a monofacial PV module. A range of tilt and azimuth combinations will provide the same minimal shadowing. Therefore, the tilt and azimuth angles should be chosen for all time steps that maximize power production and are physically realizable.

In the tenth embodiment, the present invention is the installation of the off-axis vertical bifacial PV module with a fixed tilt angle and fixed pitch angle to achieve minimal radiation loss over the region of interest on the field integrated over the period of time of interest at a given geographical location. To achieve this, $E_{PV}$ (Eqn. 3-5) must be minimized over the time period of interest. To find the optimal tilt and azimuth angles, we propose minimizing $E_{PV}$ for the time period of interest at a given geographical location using 2D optimization with $T_m$ and $AZ_m$ as variables. A bifacial module is expected to output more power per unit land area compared to a monofacial PV module. A range of tilt and azimuth combinations will provide the same minimal shadowing. Therefore, the tilt and azimuth angles should be chosen for all time steps that maximize power production and are physically realizable.

In the eleventh embodiment, the present invention is the installation of the PV module, monofacial or bifacial, with two axes of rotation, the tilt and the azimuth axes, with full or limited degree of freedom, with two types of tracking algorithms. One type, the anti-solar-tracking algorithm, will aim to achieve minimal radiation loss over the region of interest on the field integrated over a period of time (in the growing season, typically centered around summer months in seasonal regions such as the U.S. Midwest). The other type of tracking algorithm will aim to achieve maximum power output integrated over a period of time (outside of the growing season, typically centered around winter months in seasonal regions such as the U.S. Midwest). This invention is for regions with non-growing off-seasons. Maximum power can be achieved using known maximum power point tracking algorithms. Estimated power output and proposed tracking algorithms for both the growing season and the non-growing season are demonstrated in "Examples." A bifacial module is expected to output more power per unit land area compared to a monofacial PV module. A range of tilt and azimuth combinations will provide the same minimal shadowing. Therefore, the tilt and azimuth angles should be chosen for all time steps that maximize power production and are physically realizable.

In the twelfth embodiment the present invention is an installation of the monofacial or bifacial PV module on a farmland with one axis of rotation, the azimuth, with full degree of freedom, and one fixed axis, the tilt. The goal is to minimize radiation intercepted by the PV module continuously throughout the day. One type, the anti-solar-tracking algorithm, will aim to achieve minimal radiation loss over the region of interest on the field integrated over a period of time (in the growing season, typically centered around summer months in seasonal regions such as the U.S. Midwest) by fixing the module tilt angle and dynamically orienting the PV module azimuth to minimize shadowing during the growing season. The other type of tracking algorithm will aim to achieve maximum power output integrated over a period of time (outside of the growing season, typically centered around winter months in seasonal regions such as the U.S. Midwest) by fixing the tilt such that power is maximized when the PV module azimuth tracks the sun using a solar tracking algorithm. This invention is for regions with non-growing off-seasons. The fixed PV module tilt can be determined by meeting minimal growing season shadowing conditions, by meeting maximal annual power capacity conditions, or by meeting necessary physical requirements to correspond with farming equipment. Maximum power can be achieved using known maximum power point tracking algorithms. A bifacial module is expected to output more power per unit land area compared to a monofacial PV module. A range of tilt and azimuth combinations will provide the same minimal shadowing. Therefore, the tilt and azimuth angles should be chosen for all time steps that maximize power production and are physically realizable.

In the thirteenth embodiment, the present invention is an installation of the monofacial or bifacial PV module on a farmland with one axis of rotation, the tilt, with full degree of freedom and one fixed axis, the azimuth. One type, the anti-solar-tracking algorithm, will aim to achieve minimal radiation loss over the region of interest on the field integrated over a period of time (in the growing season, typically centered around summer months in seasonal regions such as the U.S. Midwest) by fixing the module azimuth angle and dynamically orienting the PV module tilt to minimize shadowing during the growing season. The other type of tracking algorithm will aim to achieve maximum power output integrated over a period of time (outside of the growing season, typically centered around winter months in seasonal regions such as the U.S. Midwest) by fixing the azimuth such that power is maximized when the PV module tilt tracks the sun using a solar tracking algorithm. This invention is for regions with non-growing off-seasons. The fixed PV module azimuth can be determined by meeting minimal growing season shadowing conditions, by meeting maximal annual power capacity conditions, or by meeting necessary physical requirements to correspond with farming equipment. Maximum power can be achieved using known maximum power point tracking algorithms. A bifacial module is expected to output more power per unit land area compared to a monofacial PV module. A range of tilt and azimuth combinations will provide the same minimal shadowing. Therefore, the tilt and azimuth angles should be chosen for all time steps that maximize power production and are physically realizable.

In the fourteenth embodiment, the present invention is the installation of the off-axis vertical monofacial or bifacial PV module with two fixed tilt angles and two fixed pitch angles, one set of which will aim to achieve minimal radiation loss over the region of interest on the farmland integrated over a period of time (in the growing season, typically centered around summer months in seasonal regions such as the U.S. Midwest); and the other set of which will aim to achieve maximum power output integrated over a period of time (outside of the growing season, typically centered around winter months in seasonal regions such as the U.S. Midwest). This invention is for regions with non-growing off-seasons. The fixed PV module azimuth and PV module tilt for each set or across sets can be determined by meeting minimal growing season shadowing conditions, by meeting maximal annual power capacity conditions, or by meeting necessary physical requirements to correspond with farming equipment. Maximum power can be achieved using known maximum power point tracking algorithms, or known fixed tilt optimization for a given period of time of interest at a given geographical location. A range of tilt and azimuth combinations will provide the same minimal shadowing. Therefore, the tilt and azimuth angles should be chosen for all time steps that maximize power production and are physically realizable.

In general, embodiments of the present novel technology relate to a photovoltaic system for generating electrical power on farmland while minimizing reduction of solar radiation incident on ground due to shadowing, including a photovoltaic module having a first photovoltaic face defining a first plane, a normal axis extending from the first plane, a first pivot axis extending through the photovoltaic module, a second pivot axis extending through the photovoltaic module, at least one motor operationally connected to pivot the photovoltaic module about at least one pivot axis, and an electronic controller operationally connected to at least one motor. An incident solar ray strikes the photovoltaic module at an angle of incidence defined as an intersection of the incident solar ray and the normal axis. The electronic controller sends signals to the at least one motor to maintain the angle of incidence as close as possible to ninety degrees.

While the present disclosure has been described with reference to certain embodiments, it will be apparent to those of ordinary skill in the art that nigh-infinite other embodiments and implementations are possible that are within the scope of the present disclosure without departing from the spirit and scope of the present disclosure. It should also be understood that the phraseology and terminology employed above are for the purpose of describing the disclosed embodiments, and do not necessarily serve as limitations to the scope of the disclosure.

What is claimed is:

1. A photovoltaic module assembly for generating electrical power on farmland while minimizing reduction of solar radiation incident on ground due to shadowing, comprising:
   a photovoltaic module having a first photovoltaic face defining a first plane and a second, oppositely disposed photovoltaic face;
   a first normal axis extending from the first plane;
   a first motor operationally connected to pivot the photovoltaic module about a first tilt axis;
   a second motor operationally connected to pivot the photovoltaic module about a second azimuth axis;
   an electronic controller operationally connected to the respective first and second motors;
   wherein the photovoltaic module has the capability for 180 degree rotation about the first tilt axis and 360 degree rotation about the second azimuth axis;
   wherein an incident solar ray strikes the photovoltaic module at an angle of incidence defined as an intersection of the incident solar ray and the first tilt axis;
   wherein the electronic controller is programmed to send signals to the respective motors to minimize the angle of incidence during a first predetermined period of time so as to minimize shadowing according to the following;
   $AOI = \cos^{-1}[\cos(T_m)\cos(Z_s) + \sin(T_m)\sin(Z_s)\cos(AZ_s - AZ_m)]$;
   wherein:
   AOI=Solar angle of incidence on the photovoltaic module (deg);
   $T_m$=Tilt angle of module (deg, wherein 0° is horizontal);
   $Z_s$=Solar zenith angle (deg);

$AZ_s$=Solar azimuth angle (deg, wherein North=0° and East=90°);

$AZ_m$=PV face azimuth angle (deg, wherein North=0° and East=90°);

wherein the total radiation available is given by $$E_{tot} = \int_{t_1}^{t_2} I_{GHI}(t) A_{field} dt;$$

wherein $I_{GHI}$=Global horizontal irradiance;

$A_{field}$=Area of field;

wherein the intercepted radiation by the PV module for a given AOI over a time period from $t_1$ to $t_2$ is given by the equations:

$$E_{PV,dir} = \int_{t_1}^{t_2} I_{DNI}(t) A_{PV} \sin(AOI(t)) \square(AOI) dt;$$

$$E_{PV,dif} = \int_{t_1}^{t_2} I_{DHI}(t) A_{PV} f(AOI) \square(AOI) dt;$$

$$E_{PV} = E_{PV,dir} + E_{PV,dif};$$

wherein:

$E_{PV}$=Energy intercepted by the photovoltaic module;

$E_{PV,dir}$=Energy intercepted by the photovoltaic module from direct solar rays;

$E_{PV,dif}$=Energy intercepted by the photovoltaic module from diffuse solar rays;

$I_{DNI}$=Direct normal irradiance;

$I_{DHI}$=Diffuse horizontal irradiance;

$A_{PV}$=Area of a PV module face;

$\square$=Angular-dependent absorption coefficient of photovoltaic module;

f=Fraction of diffuse irradiance intercepted by the photovoltaic module;

$E_{r,atmosphere}$=Reflected radiation from the PV panels into the atmosphere;

wherein the radiation available to the field is given by:

$E_{field}=E_{tot}-E_{PV}-E_{r,atmosphere}$; and wherein the electronic minimizes the angle of incidence during a first predetermined period of time by sending a signal to set the angle of incidence at 0 degrees;

wherein the electronic controller sends signals to the respective motors to maintain the angle of incidence at ninety degrees during a second predetermined period of time to maximize power output by setting the angle of incidence at 90 degrees.

2. A photovoltaic system for generating electrical power on farmland while minimizing reduction of solar radiation incident on ground due to shadowing, comprising:

a photovoltaic module having a first photovoltaic face defining a first plane and a second, oppositely disposed photovoltaic face;

a normal axis extending from the first plane;

a first rotation axis extending through the photovoltaic module;

a second rotation axis extending through the photovoltaic module;

at least one motor operationally connected to rotate the photovoltaic module about at least one of respective first and second rotation axes;

an electronic controller operationally connected to at least one motor;

wherein an incident solar ray strikes the photovoltaic module at an angle of incidence defined as an intersection of the incident solar ray and the normal axis;

wherein during a first predetermined period of time corresponding to a growing season the electronic controller is programmed to send signals to the at least one motor to orient the photovoltaic module to minimize energy intercepted by the photovoltaic module by setting the angle of incidence equal to zero degrees; and wherein during a second predetermined period of time outside the growing season the electronic controller is programmed to send signals to the at least one motor to maintain the angle of incidence of about ninety degrees to maximize energy intercepted by the photovoltaic module by setting the angle of incidence equal to ninety degrees;

wherein:

$AOI=\cos^{-1}[\cos(T_m)\cos(Z_s)+\sin(T_m)\sin(Z_s)\cos(AZ_s-AZ_m)]$;

AOI=Solar angle of incidence on the photovoltaic module (deg);

$T_m$=Tilt angle of module (deg, wherein 0° is horizontal);

$Z_s$=Solar zenith angle (deg);

$AZ_s$=Solar azimuth angle (deg, wherein North=0° and East=90°);

$AZ_m$=PV face azimuth angle (deg, wherein North=0° and East=90°);

wherein the total radiation available is given by $$E_{tot} = \int_{t_1}^{t_2} I_{GHI}(t) A_{field} dt;$$

wherein $I_{GHI}$=Global horizontal irradiance;

$A_{field}$=Area of field;

the intercepted radiation by the PV module for a given AOI over a time period from $t_1$ to $t_2$ is given by the equations:

$$E_{PV,dir} = \int_{t_1}^{t_2} I_{DNI}(t) A_{PV} \sin(AOI(t)) \square(AOI) dt;$$

$$E_{PV,dif} = \int_{t_1}^{t_2} I_{DHI}(t) A_{PV} f(AOI) \square(AOI) dt;$$

$$E_{PV} = E_{PV,dir} + E_{PV,dif};$$

wherein:

$E_{PV}$=Energy intercepted by the photovoltaic module;

$E_{PV,dir}$=Energy intercepted by the photovoltaic module from direct solar rays;

$E_{PV,dif}$=Energy intercepted by the photovoltaic module from diffuse solar rays;

$I_{DNI}$=Direct normal irradiance;

$I_{DHI}$=Diffuse horizontal irradiance;

$A_{PV}$=Area of a PV module face;

☐=Angular-dependent absorption coefficient of photovoltaic module;
f=Fraction of diffuse irradiance intercepted by the photovoltaic module;
$E_{r,atmosphere}$=Reflected radiation from the PV panels into the atmosphere;
wherein the radiation available to the field is given by; and
$E_{field}=E_{tot}-E_{PV}-E_{r,atmosphere}$.

3. The system of claim 2 wherein the first pivot axis defines tilt of the photovoltaic module and wherein the second rotation axis defines azimuthal orientation of the photovoltaic module.

4. The system of claim 3 wherein the module is pivotable about the first rotation axis.

5. The system of claim 3 wherein the module is pivotable about the second rotation axis.

6. The system of claim 5 wherein the module is pivotable about the first rotation axis and about the second rotation axis and the at least one motor includes a first motor operationally connected to the module for pivoting the module about the first rotation axis and a second motor operationally connected to the module for pivoting the module about the second rotation axis.

7. The system of claim 3 wherein the electronic controller is programmed with a first algorithm for controlling the first motor and a second algorithm for controlling the second motor.

8. A method for generating electric power on active use farmland while minimizing shadow disruption, comprising:
   a) installing a photovoltaic module having a first generally planar photovoltaic face, a second, oppositely disposed photovoltaic face, a tilt axis, and an azimuth axis, wherein the photovoltaic module casts a shadow on active use farmland; and
   b) using an electronic controller operationally connected to the photovoltaic module, the electronic controller programmed to automatically pivot the photovoltaic module about at least one respective axis to orient the photovoltaic face parallel to a line extending from the sun to the photovoltaic module according to:
   $AOI=\cos^{-1}[\cos(T_m)\cos(Z_s)+\sin(T_m)\sin(Z_s)\cos(AZ_s-AZ_m)]$;
wherein:
AOI=Solar angle of incidence on the photovoltaic module (deg);
$T_m$=Tilt angle of module (deg, wherein 0° is horizontal);
$Z_s$=Solar zenith angle (deg);
$AZ_s$=Solar azimuth angle (deg, wherein North=0° and East=90°);
$AZ_m$=PV face azimuth angle (deg, wherein North=0° and East=90°);
wherein the total radiation available is given by $$E_{tot} = \int_{t_1}^{t_2} I_{GHI}(t) A_{field} dt;$$

wherein
$I_{GHI}$=Global horizontal irradiance;
$A_{field}$=Area of field;
the intercepted radiation by the PV module for a given AOI over a time period from $t_1$ to $t_2$ is given by the equations:

$$E_{PV,dir} = \int_{t_1}^{t_2} I_{DNI}(t) A_{PV} \sin(AOI(t)) \square(AOI) dt;$$

$$E_{PV,dif} = \int_{t_1}^{t_2} I_{DHI}(t) A_{PV} f(AOI) \square(AOI) dt;$$

$$E_{PV} = E_{PV,dir} + E_{PV,dif};$$

wherein:
$E_{PV}$=Energy intercepted by the photovoltaic module;
$E_{PV,dir}$=Energy intercepted by the photovoltaic module from direct solar rays;
$E_{PV,dif}$=Energy intercepted by the photovoltaic module from diffuse solar rays;
$I_{DNI}$=Direct normal irradiance;
$I_{DHI}$=Diffuse horizontal irradiance;
$A_{PV}$=Area of a PV module face;
☐=Angular-dependent absorption coefficient of photovoltaic module;
f=Fraction of diffuse irradiance intercepted by the photovoltaic module;
$E_{r,atmosphere}$=Reflected radiation from the PV panels into the atmosphere;
wherein the radiation available to the field is given by;
$E_{field}=E_{tot}-E_{PV}-E_{r,atmosphere}$.

* * * * *